US011931910B2

(12) United States Patent
Oridate et al.

(10) Patent No.: US 11,931,910 B2
(45) Date of Patent: Mar. 19, 2024

(54) USE OF ARTIFICIAL INTELLIGENCE MODELS TO IDENTIFY FASTENERS AND PERFORM RELATED OPERATIONS

(71) Applicant: Wilder Systems Inc., Austin, TX (US)

(72) Inventors: Ademola Ayodeji Oridate, Austin, TX (US); William Wilder, Austin, TX (US); Spencer Voiss, Austin, TX (US)

(73) Assignee: Wilder Systems Inc., Austin, TX (US)

( * ) Notice: Subject to any disclaimer, the term of this patent is extended or adjusted under 35 U.S.C. 154(b) by 0 days.

(21) Appl. No.: 18/447,230

(22) Filed: Aug. 9, 2023

(65) Prior Publication Data

US 2024/0051148 A1 Feb. 15, 2024

Related U.S. Application Data

(60) Provisional application No. 63/481,576, filed on Jan. 25, 2023, provisional application No. 63/481,563, filed on Jan. 25, 2023, provisional application No. 63/377,149, filed on Sep. 26, 2022, provisional application No. 63/398,203, filed on Aug. 15, 2022, provisional application No. 63/398,202, filed on Aug.
(Continued)

(51) Int. Cl.
*B25J 9/16* (2006.01)

(52) U.S. Cl.
CPC .......... *B25J 9/1697* (2013.01); *B25J 9/161* (2013.01); *G05B 2219/33002* (2013.01); *G05B 2219/45066* (2013.01)

(58) Field of Classification Search
CPC ............ B25J 9/1697; B25J 9/161; G05B 2219/33002; G05B 2219/45066
See application file for complete search history.

(56) References Cited

U.S. PATENT DOCUMENTS

2003/0149502 A1* 8/2003 Rebello ............. G05B 19/4097
  700/118
2004/0039465 A1* 2/2004 Boyer ................ G05B 19/401
  700/95
(Continued)

OTHER PUBLICATIONS

Oridate , "Velocity-Based Robot Motion Planner for Under-Constrained Trajectories with Part-Specific Geometric Variances", The University of Texas, Dec. 2021, 178 pages.

*Primary Examiner* — Bao Long T Nguyen
*Assistant Examiner* — Dylan Brandon Mooney
(74) *Attorney, Agent, or Firm* — Kilpatrick Townsend & Stockton LLP

(57) ABSTRACT

Aspects of the disclosure are directed towards artificial intelligence-based modeling of target objects, such as aircraft parts. In an example, a system initially trains a machine learning (ML) model based on synthetic images generated based on multi-dimensional representation of target objects. The same system or a different system subsequently further trains the ML model based on actual images generated by cameras positioned by robots relative to target objects. The ML model can be used to process an image generated by a camera positioned by a robot relative to a target object based on a multi-dimensional representation of the target object. The output of the ML model can indicate, for a detected target, position data, a target type, and/or a visual inspection property. This output can then be used to update the multi-dimensional representation, which is then used to perform robotics operations on the target object.

20 Claims, 21 Drawing Sheets

Related U.S. Application Data

15, 2022, provisional application No. 63/396,938, filed on Aug. 10, 2022.

(56) References Cited

U.S. PATENT DOCUMENTS

| | | | |
|---|---|---|---|
| 2014/0305217 A1* | 10/2014 | Tapia | G01N 27/9013 901/44 |
| 2015/0314888 A1* | 11/2015 | Reid | B25J 13/089 901/44 |
| 2017/0182666 A1* | 6/2017 | Szarski | B25J 13/089 |
| 2020/0134860 A1* | 4/2020 | Haven | B25J 9/1697 |
| 2021/0138600 A1* | 5/2021 | Sato | B23B 35/00 |

* cited by examiner

USE OF ARTIFICIAL INTELLIGENCE MODELS TO IDENTIFY FASTENERS AND PERFORM RELATED OPERATIONS

CROSS-REFERENCE TO RELATED APPLICATIONS

This application claims priority under 35 U.S.C. § 119(e) to U.S. Provisional Application No. 63/396,938, filed Aug. 10, 2022, U.S. Provisional Application No. 63/398,202, filed on Aug. 15, 2022, U.S. Provisional Application No. 63/398,203, filed on Aug. 15, 2022, U.S. Provisional Application No. 63/377,149, filed on Sep. 26, 2022, U.S. Provisional Application No. 63/481,563, filed on Jan. 25, 2023, and U.S. Provisional Application No. 63/481,576, filed on Jan. 25, 2023, the contents of which is are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of enterprise workers.

BRIEF DESCRIPTION OF THE DRAWINGS

Various embodiments in accordance with the present disclosure will be described with reference to the drawings in which.

DETAILED DESCRIPTION

Figure 1:
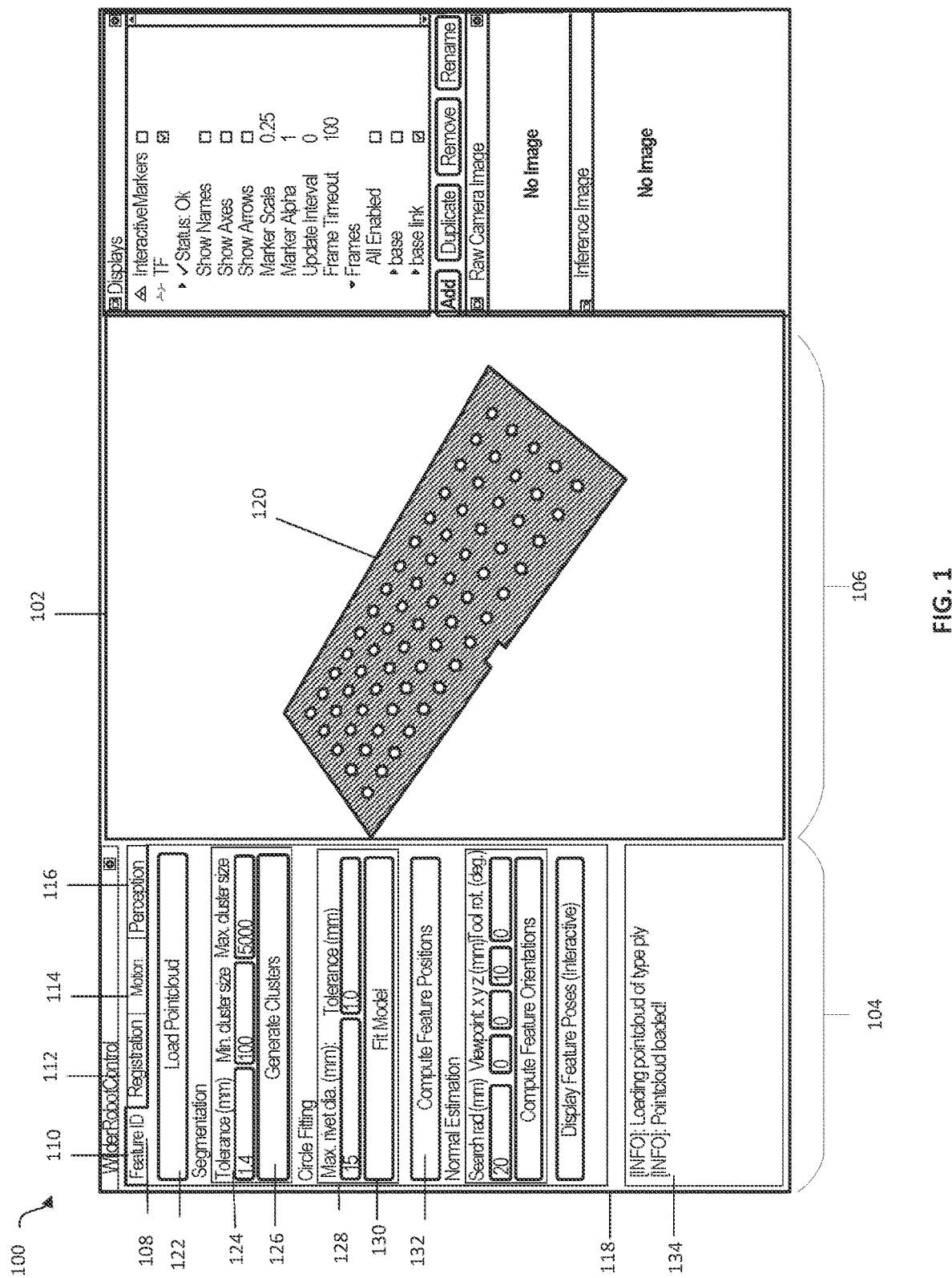
FIG. 1 is an illustration of a user interface (UI) for guiding a robot, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Aircraft fasteners are mechanical devices that are used to assemble two or more aircraft parts into assemblies that form the aircraft. Engineers consider various factors, such as shear stress and aircraft load, when considering a type of fastener and the number of fasteners for each assembly. A fastener can vary from another fastener based on diameter, material, and shape. The fasteners are inserted into holes that are arranged through the aircraft parts. A single wing can include thousands of holes, and an entire aircraft can include hundreds of thousands of holes. As an aircraft ages or incurs damage, the aircraft's damaged or worn parts need to be removed and replaced with new parts. In some instances, these aircraft fasteners are removed from the worn or damaged aircraft parts using a drilling tool.

A drilling tool is selected based on the fastener type, and the drill's trajectory can be based on the orientation of the fastener and hole with respect to the aircraft part. If an incorrect drill is selected or drill is not inserted correctly into the fastener, the fastener may not be removed and the aircraft part can be damaged. One issue related to fastener removal is that the fasteners are not uniformly arranged over different aircraft, even the same model aircraft. A first aircraft part can be mounted on an aircraft through a first set of fasteners. The same aircraft part type can be mounted on another aircraft that is the same model aircraft, but through a second set of fasteners that are oriented differently on the aircraft part than the first set of fasteners. The individualized arrangement of fasteners for each aircraft part is amplified by the fact that some aircraft parts include multiple types of fasteners. Therefore, when inserting a bit into a fastener, the individual orientation and type of fastener has to be considered to properly remove a fastener. This issue is compounded with the inability to use the orientation of a set of fasteners in one aircraft part as a template for another set of fasteners in a similar aircraft part. This can be an issue for designing an automated system for aircraft fastener removal as the system needs to generate a path and trajectory to reach each fastener on an individual basis for proper aircraft fastener removal.

Embodiments described herein addressed the above-referenced issues via a system that can guide a robot through dynamic path planning and trajectory planning. A user can use a user interface (UI), to direct the robot to receive point cloud data that represents a target object. The point cloud data can be segmented to associate point cloud data points to different objects in the point cloud data. The system can extract features from the segmented objects to identify a target object, such as an aircraft panel. The system can further identify real-world targets within the target object, such as holes or fastener heads. The user can further use the UI to direct the system to estimate the target's three-dimensional position in space and calculate a normal extending away from the surface of the target. The system can use the three-dimensional position and the normal to guide an end effector, such as a drill into the real-world target. The user can further use the UI for registration to obtain a transformation matrix for transforming a working frame of a target object to a reference frame of the robot. The user can further use the UI to direct the system to generate a set of virtual points and calculate a path using the virtual points over the surface of the target object. Based on the computed path, the user can use the UI to direct the system to compute a trajectory to traverse the computed path. The trajectory can include a set of movements for each joint of the robot to traverse the path while avoiding collisions and accounting for the limitations of the robot.

By using the UI, a multi-dimensional representation of the target object (e.g., a three-dimensional model thereof) becomes possible. This multi-dimensional representation can indicate the pose (e.g., the position and orientation) of each target of the target object in the working frame of the object (e.g., a coordinate system defined locally relative to a reference point included in the object).

Embodiments of the present disclosure further relate to updating the multi-dimensional representation to enable more precise robotic operations on the target object (e.g., fastener removal operations applied to an aircraft part). This update can rely on artificial intelligence (AI) techniques. For example, the multi-dimensional representation can be used for path and trajectory planning to control a robot. The robot can include a camera (e.g., a two-dimensional camera) set as a tool center point (TCP). Given the trajectory, the robot can be controlled to position the camera at a predefined distance relative to a target of the target object (e.g., a fastener of the aircraft part). While positioned, the camera can generate an image that shows at least a portion of the target object, where this portion includes the target. An input to a machine learning (ML) model, such as a computer vision neural network, can be generated based on the image. The ML model can generate an output based on the input. This output can indicate data of the target as detected from the image. The output can also indicate a classification of the target (e.g., the target having a target type) and/or a visual inspection property of the target (e.g., a property of the fastener that would be determined by a visual inspection of the fastener, such as a corrosion level of the fastener). If the position data is two-dimensional (e.g., along an X-Y plane), it can be augmented to become three dimensional based on the predefined distance. If already three dimensional (e.g., based on a depth sensor that may or may not be part of the camera), no such augmentation may be needed. Further, if no depth data is available, the orientation of the camera can be known based on the TCP control, whereby the camera is normalized to the target. The camera orientation can be set as the orientation of the target. If depth data is available, the orientation of the target can be derived from the depth data. In both cases, the target's position and orientation in space are determined and correspond to a pose of the target in a coordinate system (e.g., the reference frame of the robot, such as a coordinate system defined locally relative to a reference point included in the robot). This pose can be translated into an actual pose defined in the working frame based on inverse and forward kinematics transformations. The actual pose can then be stored in an updated multi-dimensional representation of the target object. This multi-dimensional representation can also be augmented to include the target's classification and visual inspection property. Thereafter, a set of robotic operations can be planned to be applied to the target object based on the updated multi-dimensional representation of the target object (e.g., to remove and replace corroded fasteners, or fastener having a particular classification). Path generation and trajectory planning can be used for this purpose.

Further, embodiments of the present disclosure can fine tune the ML model by generating training data from actual detection of targets across one or more target objects. To illustrate, consider an example of an image showing a target. This image can be processed as described herein above to determine pose data, classification, and/or visual inspection property of the target. A human in the loop machine learning approach can be implemented, whereby input can be received indicating corrected pose data, corrected classification, and/or corrected visual inspection property. The corrected pose data, corrected classification, and/or corrected visual inspection property and the image can be used to generate additional training data. The additional training data can be included in a training dataset and this dataset can be used to further train the machine learning model.

Embodiment of the present disclosure are described in connection with aircraft parts and fastener removal operations. However, the embodiments are not limited as such and, instead, similarly apply to any other types of target objects and/or any operations that rely on multi-dimensional models. The target objects can include automobile parts, boat parts, rocket parts, and/or other types of parts with simple or complex geometries. Target objects can also include the entirety of an automobile, a boat, and/or a rocket. In addition or alternative to fastener removal, the operations can include fastener additions, fastener hole detection, fastener hole resizing or reworking, surface treatment (e.g., for corrosion treatment), drilling, stamping, etching, deburring, welding, spot welding, gluing, sewing, sealing, painting, depainting, washing, etc.

FIG. 1 is a user interface (UI) 100 of an application for guiding a robot, in accordance with one or more embodiments. The UI 100 is a point of interaction between a user and computing elements of a system. The computing elements can be a collection of hardware elements, such as a user computing device and/or a bare metal server, and software elements, such as an application, for path generation, trajectory generation, and guiding a robot. The UI 100 can be a collection of interface elements that include input controls (e.g., buttons, text fields, checkboxes, dropdown lists), navigational components (e.g., sliders, search fields, tags, icons), informational components, (progress bar, notifications, messages boxes), and containers (e.g., accordions). As illustrated, the UI 100 is a multi-panel UI, where multiple pages can be contained within a single window 102. Each page can be accessed through a respective page tab. The UI 100 can include an action pane 104 that includes a collection of input controls, navigational components, and informational components. The UI 100 can further include a visualization pane 106 for providing a visualization of, for example, point cloud segmentation, path generation, and trajectory generation. The action pane 104 can be adjacent to the visualization pane 106 and both can be displayed on the single window 102. The UI can include one more additional pane, such as a display selection pane described below.

The action pane 104 can include a navigation pane 108, which includes tabs for navigating to respective pages of the UI 100. As illustrated, the UI 100 can include a feature identification (Feature ID) tab 110 for navigating to a feature identification page, a registration tab 112 for navigating to a registration page, a motion plan tab 114 for navigating to a motion plan page, and a perception tab 116 for navigating to a perception page.

In FIG. 1, a user has selected the feature identification tab 110, and therefore, the feature identification page is displayed. A user can use the feature identification page 118 to select input controls for segmenting a point cloud, associating point cloud data to objects included in a target object, and computing a normal to and/or from the surface of the target object. The user can store a three-dimensional representation (e.g., a point cloud or computer-aided design (CAD) file) of a target object in a computing system to be later displayed as visualization 120. The user can click on a Load Pointcloud button 122 and access a file system of a computing system. In response to receiving a selection of the Load Pointcloud button 122, the UI 100 can display the file system (e.g., files and folders), and the user can select the three-dimensional representation to retrieve for the application.

The application can retrieve the three-dimensional representation, which can be displayed as a visualization 120 on the visualization pane 106. As illustrated, point cloud data represented as a visualization 120 is displayed on the visualization pane 106. In this instance, the visualization 120 is of a real-world panel with an array of holes. In practical applications, the visualization 120 can be of any real-world part or assembly (aircraft component, vehicle component, structure component). In other instances, the visualization 120 can be any object upon which a path and a trajectory is to be generated. The visualization 120 can be a three-dimensional representation that can be manipulated by the user through the UI 100. The user can manipulate the visualization to change the position to the visualization 120. For example, the user can use a peripheral device, such as a keyboard, to enter commands, or a mouse to click a cursor on the visualization plane 106, to rotate, flip, zoom in or zoom out the visualization 120. In response to the input signal from the peripheral device, the UI 100 can alter the three-dimensional position and the orientation of the visualization 120.

The user can further use the UI 100 to engage in a segmentation process for associating point cloud data points to objects in the visualization 120. The UI 100 can include a first set of fields 124 for inputting segmentation parameters. A user can manually select a field and type in a target value for a parameter. The segmentation parameters can include tolerance, which can include a maximum distance between point cloud data points to be considered part of a cluster. The segmentation parameters can include a minimum size, which can be the minimum number of data points needed to form a cluster. The segmentation parameters can further include a maximum cluster size, which can be the maximum number of data points needed to form a cluster. In some instances, certain objects can have an estimated number of data points. Therefore, the user can use the segmentation parameters to select a minimum cluster size below the estimated cluster size and select a maximum cluster size to be above estimated cluster size. In this sense, the user can use the UI 100 to filter out objects that have an estimated number of data points below the minimum cluster size and objects that have an estimated number of data points above the maximum cluster size. The user can then click a Generate Clusters button 126 to initiate a segmentation phase. The application can receive each of the user defined parameter values in response to a single click of the Generate Clusters button 126 and segment the three-dimensional representation accordingly. The segmentation phase can include executing a distance measuring function (e.g., Euclidean distance function) from a library and determining a distance between the data points. The application can select data points that are within a threshold distance of each other to be considered a cluster. The segmentation phase can further include identifying clusters based on a minimum cluster size and a maximum cluster size. As used herein an identified cluster can be considered an object. For example, as seen in FIG. 1, the objects can include the holes or the sides of the visualization 120.

The UI 100 can further permit the user to follow the segmentation phase with an identification phase, in which the application can determine whether an identified cluster corresponds to a real-world target (e.g., hole, fastener). The UI 100 can include an input control button for executing an object recognition model. The model can be a rules-based model or a machine learning model. The model can further be configured to extract features from the clusters as inputs and predict a class for each cluster. As indicated above, the herein embodiments are illustrated with respect real-world targets that are holes or fasteners. Therefore, the model can be a circlefitting model configured to fit circles to the identified clusters. The feature identification page 118 of the UI 100 can include a second set of fields 128 for inputting model parameters. The fields can include, for example, a maximum diameter field and a tolerance field. A user can enter target values for each field of the second set of fields. For example, the user can select a value for the maximum diameter size of a cluster to be considered a hole or fastener. The feature identification page 118 can further include a Fit Model button 130 for initiating the model fitting. In response to receiving an input signal from the Fit Model button 130, the application can initiate the object recognition model (e.g., circle fitting algorithm). The object recognition model can receive the clusters and user-based parameters from the second set of fields as inputs, and fit a predefined model (e.g., a circle) to the clusters. The clusters that fit the model and are within the user-based parameters of the second set of fields 128 are considered to be real-world targets. The application can alter the visualization 120 (e.g., change color, change texture, add three-dimensional structure, or otherwise visually mark) of the clusters that correspond to real-world targets in the visualization pane 106. Therefore, a user viewing the visualization 120 can visually identify the targets (e.g., real-world targets).

The feature identification page 118 can further permit the user to initiate identification of a relative position of each target on the visualization 120. The feature identification page 118 can include a Compute Feature Positions button 132 for initiating the application to execute an algorithm to determine the relative position of each target. It should be appreciated that the input control button names and functions are not limiting. Each of the UI 100 elements can perform the general functions described, notwithstanding the name. For example, the Load Pointcloud button 122 allows the user to select a point cloud to retrieve for the application. If the application was tasked with locating targets in a different three-dimensional representation such as computer-aided design (CAD), the UI 100 could include a Load CAD button. Once the application computes the relative positions of the targets, the UI 100 can permit a user to calculate the respective normal for each cluster that corresponds to a real-world target. The calculation and visualization of the normal is described with respect to FIG. 2. The action pane 104 can further include a log window 134 for displaying a log of the actions executed by the application.

Figure 2:
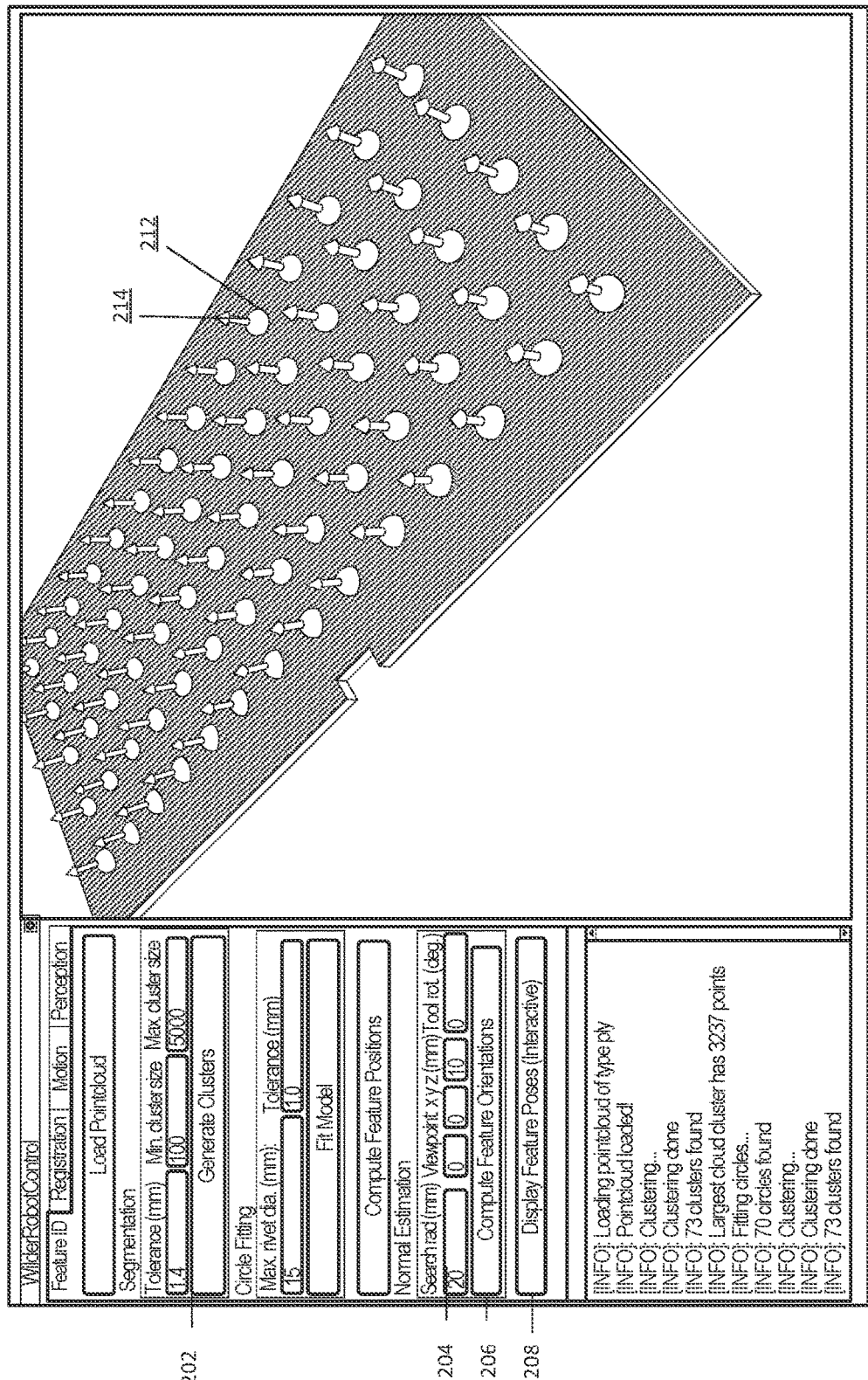
FIG. 2 is an illustration of a UI for guiding a robot, in accordance with one or more embodiments.

FIG. 2 is an illustration of a UI 200 for guiding a robot, in accordance with one or more embodiments. For purposes of illustration, only the action pane and a visualization pane of the UI 200 are illustrated. The feature identification page 202 of the UI 200 can include a third set of fields 204 for inputting parameters for calculating a respective normal. The normal is a line that is orthogonal to a surface of a cluster that corresponds to a real-world target. The normal can be used to guide a robotic end effector, such as a drill, into or away from the target. The third set of fields 204 can include, for example, a search radius field, an x, y, and z viewpoint field, and a tool rotation field. A user can enter target values into each field of the third set of fields 204 through the UI 100. The feature identification page 202 can include a Compute Feature Orientations button 206. The user can click the Compute Feature Orientations button 206 and the application can initiate a normal calculation phase in response. The feature identification page 202 can further include a pose estimate phase to define a set of waypoints (e.g., virtual points) on the surface of the target object. The waypoints can correspond to each cluster that corresponds to a real-world target (e.g., hole, fastener, or location to drill a hole), and a number of waypoints can be greater than the number of objects, or less than the number of clusters that corresponds to a real-world target. The application can assume no coplanar waypoints and calculate a normal for each cluster that corresponds to a real-world target. The orientation of each normal to the surface of the target object can be based on the objects identified in the point cloud data. Therefore, one normal can be perfectly orthogonal to the surface of the target object, whereas an adjacent normal can be slightly tilted and not orthogonal to the surface. As indicated above, holes can be drilled, and fasteners inserted manually. Therefore, the direction of the hole or fastener into the target object may be oriented differently to the target object. Therefore, a single click of the Compute Feature Orientations button 206 can initiate a normal calculation phase with respect to each waypoint for proper normal calculation.

The application can further specify a viewpoint or specify whether the normal is calculated with a direction toward the target or a direction away from the target. This can be calculated based on the user-defined parameters inputted into the third set of fields 204. The application can further specify an orientation of the cluster that corresponds to a real-world target. The robot end effector's motion could have more degrees of freedom than the degrees sufficient to locate the targets in three-dimensional space. Therefore, to calculate the movements of the robotic arm and end effector in three-dimensional space, it can be essential to consider the orientation of the targets to properly approach and recede from a real-world target.

The UI 200 can further provide a visualization of the calculated normals on the visualization pane 210. The feature identification page 202 includes a Display Feature Poses button 208 (e.g., input control button). The user can click the Display Feature Poses button 208 and in response, the application can display the calculated normals on a visualization pane 210. A respective waypoint 212 located at a target of an array of clusters that corresponds to a real-world target is illustrated in the visualization pane 210 of the UI 200. The waypoint is a virtual point, where a number of waypoints can be less than a number of targets, greater than a number of targets or the same as a number of targets. The waypoint 212 includes a normal 214 with a directional arrow indicating that the normal 214 is extending away from the waypoint 212. As illustrated, each cluster that corresponds to a real-world target includes a normal extending away from waypoint 216 at a target. This visualization pane feature permits the user to verify whether the calculated normal properly extends either towards or away from each target prior to initiating an actual robot.

Figure 3:
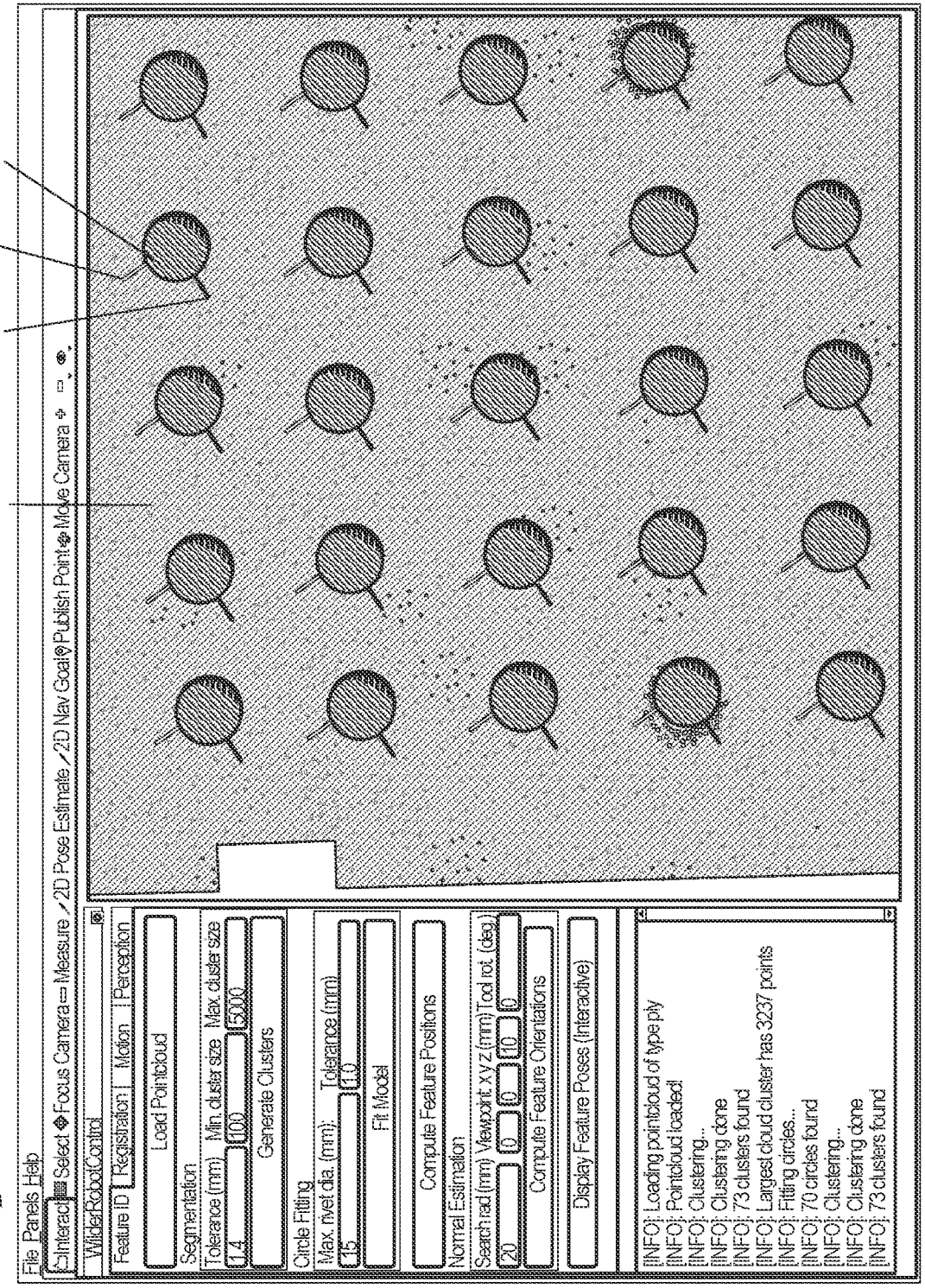
FIG. 3 is an illustration of a UI for guiding a robot, in accordance with one or more embodiments.

In addition to providing a visualization of the normal, which can be considered a z-direction vector, the UI can provide an x-direction vector and a y-direction vector. FIG. 3 is an illustration of a UI 300 of an application for guiding a robot, according to one or more embodiments. For purposes of illustration, only the action pane and a visualization pane of the UI 300 are illustrated. A visualization pane 302 of the UI 300 can display a visualization 304, including an array of targets. A cluster that corresponds to a real-world target 306 (e.g., hole, fastener, location to drill a hole) can include an x-direction vector visualization 308 and a y-direction vector visualization 310. The x-direction vector visualization 308 can be perpendicular to the y-direction vector visualization 310. Each of the x-direction vector visualization 308 can be perpendicular to the y-direction vector visualization 310 can be perpendicular to a normal. These vector visualizations can permit the user to verify whether an orientation of the real-world object to the robotic end effector is correct prior to initiating the robot.

Figure 4:
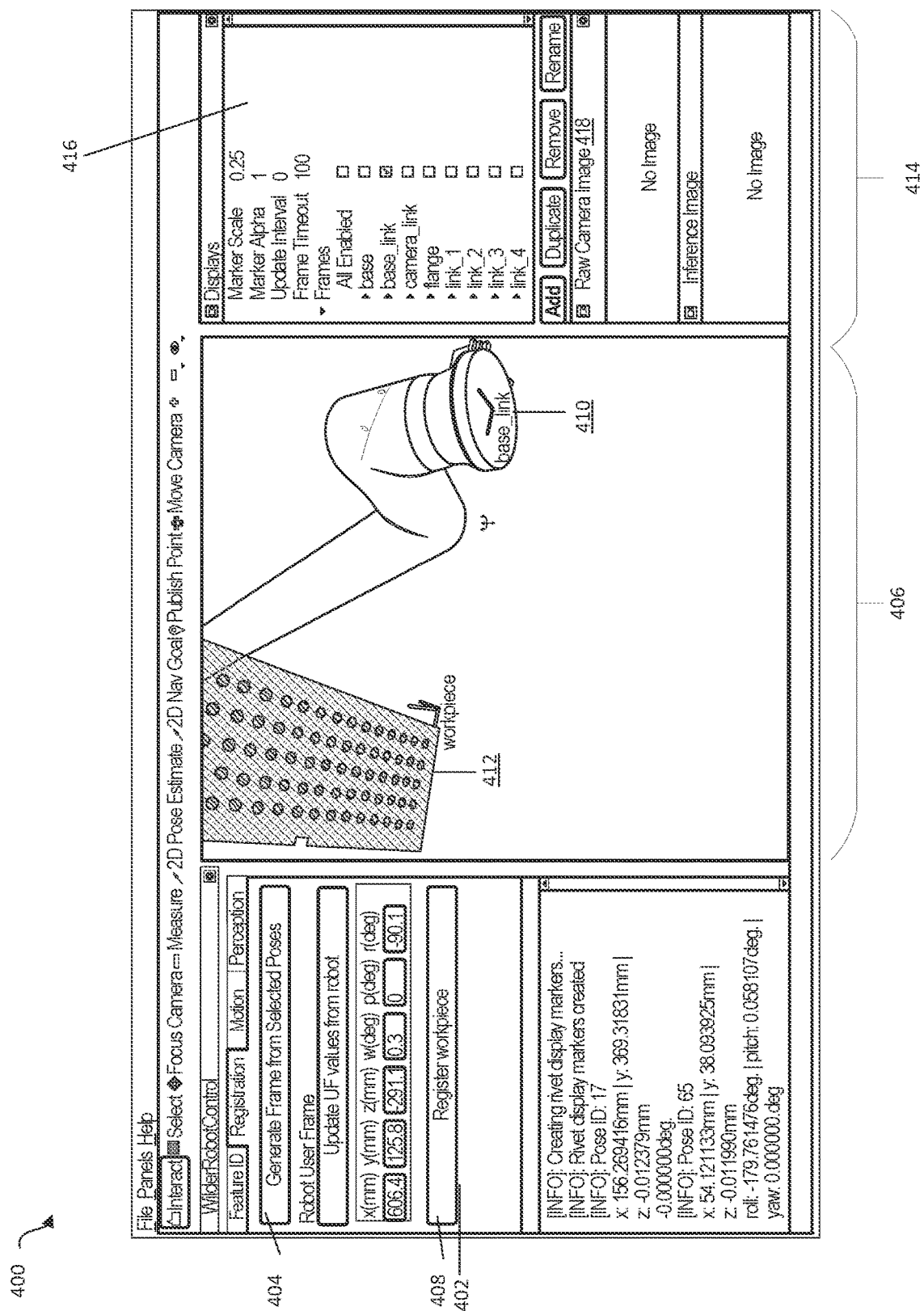
FIG. 4 is an illustration of a UI for guiding a robot, in accordance with one or more embodiments.

FIG. 4 is an illustration of a UI 400 for guiding a robot, in accordance with one or more embodiments. FIG. 4 illustrates a registration page 402 of the UI 400. A user can access the registration page 402 by moving a cursor to a navigation pane and clicking a registration tab. The registration page 402 can initially be arranged underneath another page(s) (e.g., a feature identification page). A user can click on the registration tab and cause the UI 400 to display the registration page 402 over the other page(s). The user can use the registration page 402 to cause the application to execute a registration phase. During the registration phase, the application can localize the position and orientation of the real-world object to the robot. In particular, the registration phase can calculate a transfer function for transforming a working frame (e.g., coordinate system of target object) to a reference frame (coordinate system of the base of the robot). The registration page can include a Generate Frame from Selected Poses button 404. The Generate Frame from Selected Poses button 404 can be for initiating the application to calculate a reference frame for the real-world object. In the real world, the target object can be oriented in three-dimensional space. For example, if the real-world object is an aircraft panel, the panel can be arranged on the fuselage, wing, or other position on the aircraft. Therefore, the UI 400 can provide the user with the UI elements to calculate a reference frame for the real-world object to be used to calculate the transfer function.

The application can use various methods to generate the working frame. The application can use, for example, a common points method or a fiducial marker method. For example, the user can use the UI 400 to select multiple clusters representing real-world targets (e.g., three targets). The UI 400 can further display visual markers for the targets on a visualization pane 406 of the UI 400. For example, each of the selected clusters that correspond to a real-world target can be displayed in a unique color that is different from each other target. The user can move the end effector of the robot to each of the targets (e.g., holes, fasteners/locations to drill a hole), to orient the tool center point (TCP) of the end effector to each of the targets. The application can then calculate measurements of a distance to the target object to be used to calculate the transfer function. The application can further use the transfer function for transforming a working frame of a target object to a reference frame of the robot.

The registration page 402 can further include a Register workpiece button 408 for initiating the application to calculate a transfer function between a reference frame of a robot and the real-world object. The UI 400 can further display the reference frame of the robot 410 and the real-word object 412. The display presented on the visualization pane 406 can be user defined by interaction with a display selection pane 414. The display selection pane 414 can include a window 416 that can include a collection of elements that a user can select. If the elements are too numerous to be displayed together, the window 416 can include functionality to scroll up and down to view each of the elements. As seen, the user has selected the base-link frame, which is displayed on the visualization pane 406. This UI functionality can provide assurance to the user that the transfer function relates to the correct reference objects. The display selection pane 414 can further include a raw camera image window 418 for presenting video. For example, if the robot included an image capturing device, the raw camera image window 418 could display a real-time streaming of images captured by the device.

Figure 5:
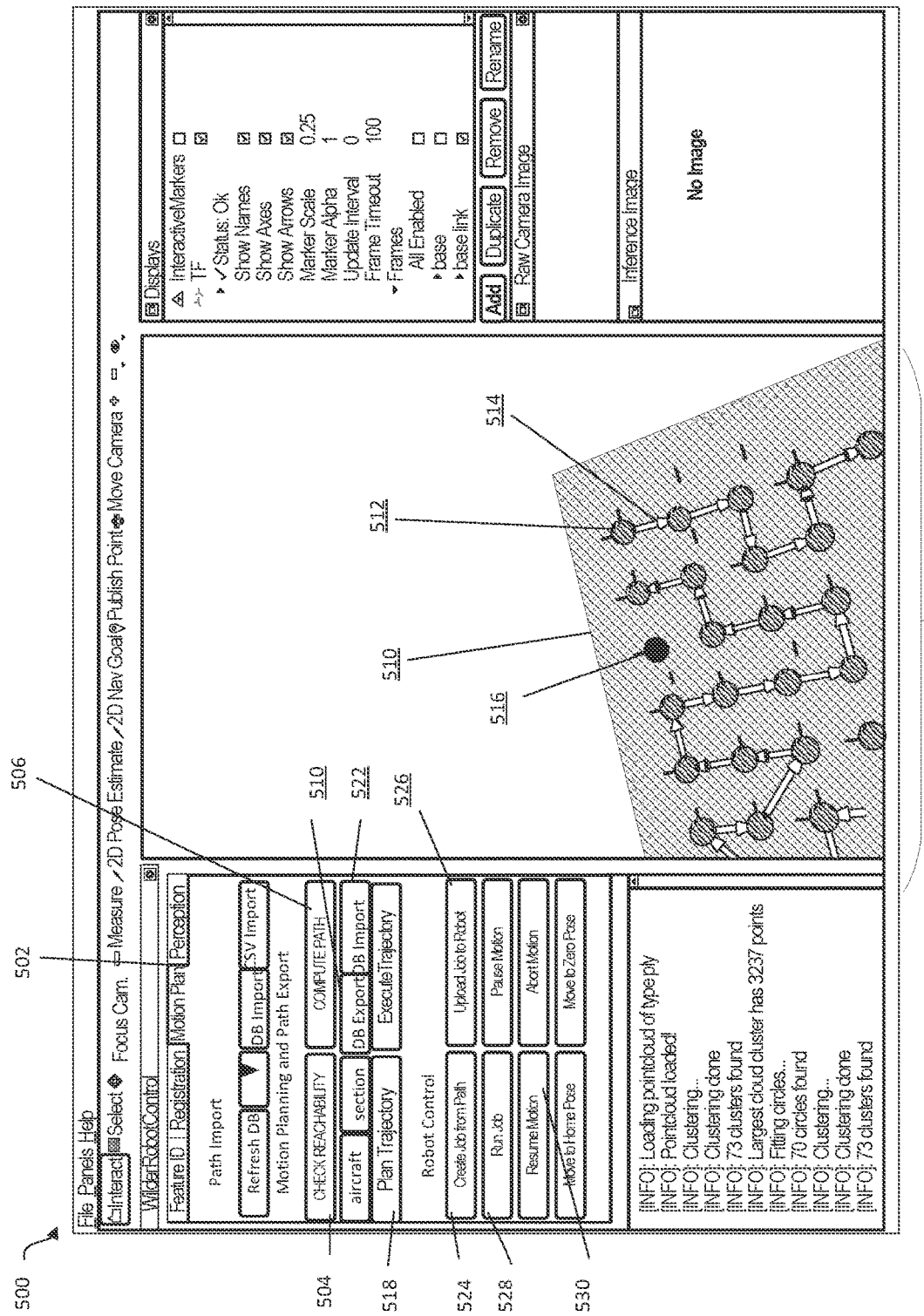
FIG. 5 is an illustration of a UI for guiding a robot, in accordance with one or more embodiments.

FIG. 5 is an illustration of a UI 500 for guiding a robot, in accordance with one or more embodiments. FIG. 5 illustrates a motion plan page 502 of the UI 500. A user can access the motion plan page 502 by moving a cursor to a navigation pane and clicking a motion plan tab. The motion plan page 502 can initially be arranged underneath another page(s) (e.g., a feature identification page and registration page). A user can click on the motion plan tab and cause the UI 500 to display the motion plan page 502 over the other page(s).

The motion plan page 502 can include a Check Reachability button 504 for initiating the application to determine whether each target is reachable. The user can click the Check Reachability button 504 and in response, the application can determine the reachability of each target. The Check Reachability button 504 can cause the application to reconcile the dimensions of the robot in relation to the dimensions of a real-world object, and retrieve data related to potential collisions between the robot and the real-world target object. For example, the Check Reachability button 504 can cause the application to retrieve data related to expected collisions between the robot and the real-world target object. The application can further determine whether the robot is likely to collide with another object based on the data.

The motion plan page 502 can further include a Compute Path button 506 for computing a path over the target. The path can be a sequence of directions to traverse the targets on the real-world object. A visualization pane 508 can display a visualization 510 of the real-world target object. The visualization 510 can include an initial target 512 that represents a first target to be traversed over the path. The visualization 510 can further include directional markers 514 that display a direction from one target to another target over the path. In this sense, the user can visually inspect the path prior to initiating a robot. If the user wishes to modify the path, the user can do so through the UI 500. The user can engage the UI 500, for example, through a peripheral device and modify one or more targets (e.g., move a visualization of a target in three-dimensional space, delete a waypoint). As illustrated, a waypoint has been removed, and the visualization pane 508 can display an absence 516 of the target. In response to the modification of a waypoint via the UI 500, the application can recalculate the path. As seen in FIG. 5, the waypoint has been removed, and no directional marker 514 is directed in toward the absence 516 of the waypoint.

The motion plan page 502 can further include a Plan Trajectory button 518 for initiating the application to generate a trajectory. The path can include a sequence of movements over the surface of the real-world object that do not consider the individual movements of the robot components. The trajectory can include a sequence of movements that include the movements of the robot components (e.g., motions of the joints of a robotic arm). The user can click the Plan Trajectory button 518, and in response, the application can calculate a trajectory for the robot. For example, the application can employ an inverse kinematics function to calculate movements for each component of a robot (e.g., an upper arm, an elbow, a lower arm, a wrist, and an end effector of the robot).

The motion plan page 502 can further include a DB Export button for exporting the path and trajectory to a database. The path and trajectory can identify a type of robot, the real-world object. For example, if the real-world object is a wing of an aircraft, the path and trajectory can further identify the individual aircraft (e.g., using an identifier, such as a tail number) that includes the wing. In this sense, the path and trajectory can be stored in the database for future use. Therefore, if an aircraft needs to be re-serviced, the individualized path and trajectory for the aircraft can be retrieved. The motion plan page 502 can further include a database (DB) import button 522. The user can click the Import Path from DB button 522 and initiate the application to retrieve a previously stored path and trajectory from the database for the robot to execute. The motion plan page 502 can further include a Create Job from Path button 524 for initiating the application to create a robot job, where the robot job can be a file having one or more portions configured to be executable by the robot. The user can click the Create Job from Path button and in response, the application can configure a file based on the path and trajectory to be executable by the robot. The motion plan page 502 can further include an Upload Job to Robot button 526 for uploading the robot job to a controller of the robot. The user can click the Upload Job to Robot button 526, and in response, the application can upload the robot job to a robot controller. The motion plan page 502 can include a Run Job button 528 for initiating the robot to execute the robot job. The user can click the Run Job button 528 and in response, the application can cause the robot to execute the robot job.

The motion plan page 502 can further include various input control buttons 530 for controlling the robot in real-time. The input control buttons can include a Move to Home Pose button, Move to Zero Pose button, Pause Motion button, Resume Motion button, and an Abort Motion task button. The user can click any of these buttons, and in response, the application can initiate a responsive motion by the robot. For example, if the user clicks the Pause Motion button, the robot can responsively pause its motion.

Figure 6:
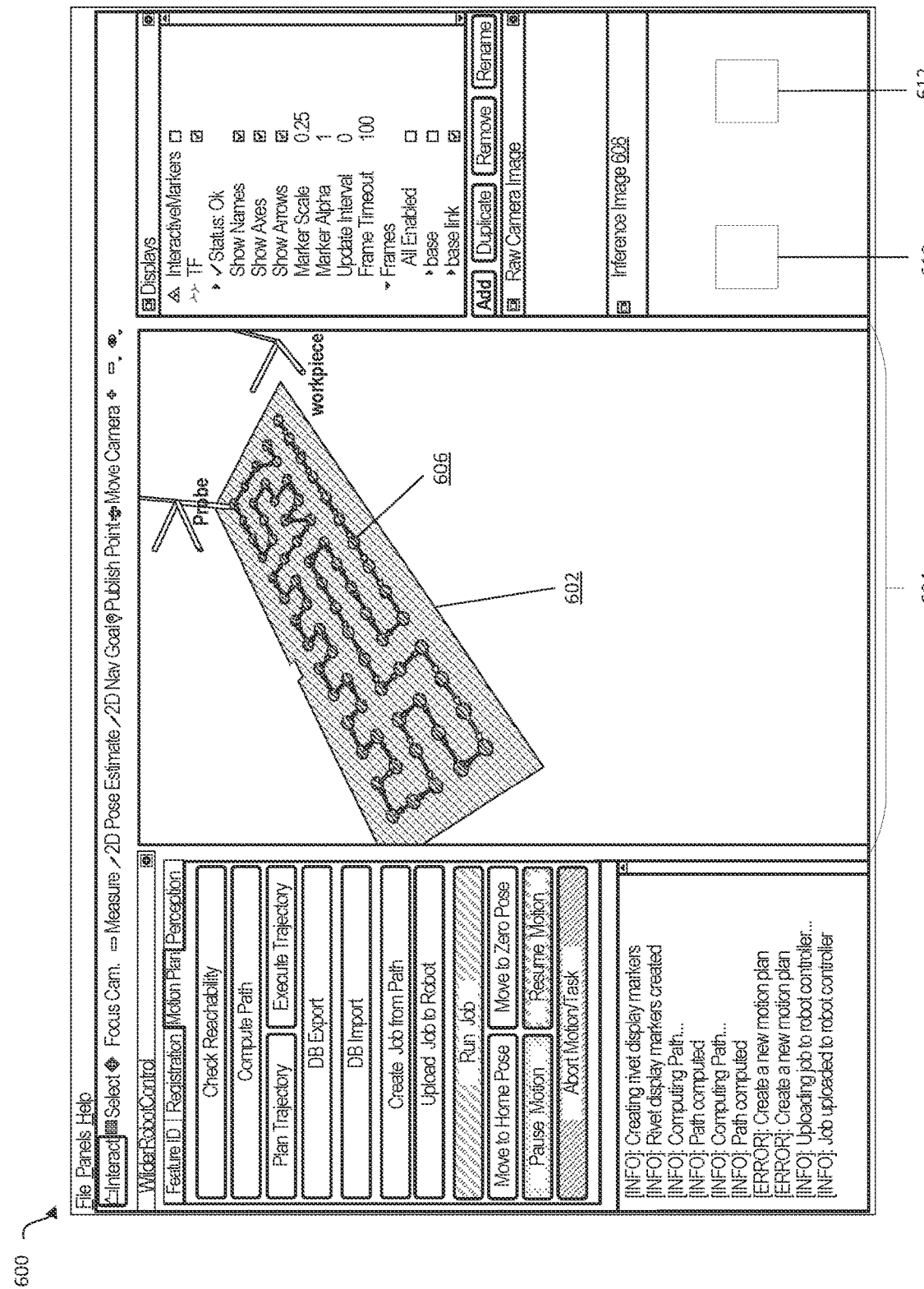
FIG. 6 is an illustration of a UI for guiding a robot, in accordance with one or more embodiments.

FIG. 6 is an illustration of a UI 600 for guiding a robot, in accordance with one or more embodiments. As illustrated, a visualization 602 is displayed on a visualization pane 604. The visualization 602 displays a path 606 for traversing targets on the real-world object. The UI 600 can further include an inference image window 608 which can display in real-time, a visual marker for each time that the robot detects a target. As illustrated, a first visual marker 610 is displayed next to a second visual marker 612. In practice a robot can be traversing the real-world object using the calculated trajectory. As the robot end effector passes over and detects a target, the visual marker can appear. Therefore, the first visual marker 610 can appear on the inference image window 608 at a first time, to, as the end effector passes over the first target; and the second visual marker 612 can appear at a second time, ti, as the end effector passes over a second target. Therefore, the user can see in real-time that the robot is detecting the target.

Figure 7:
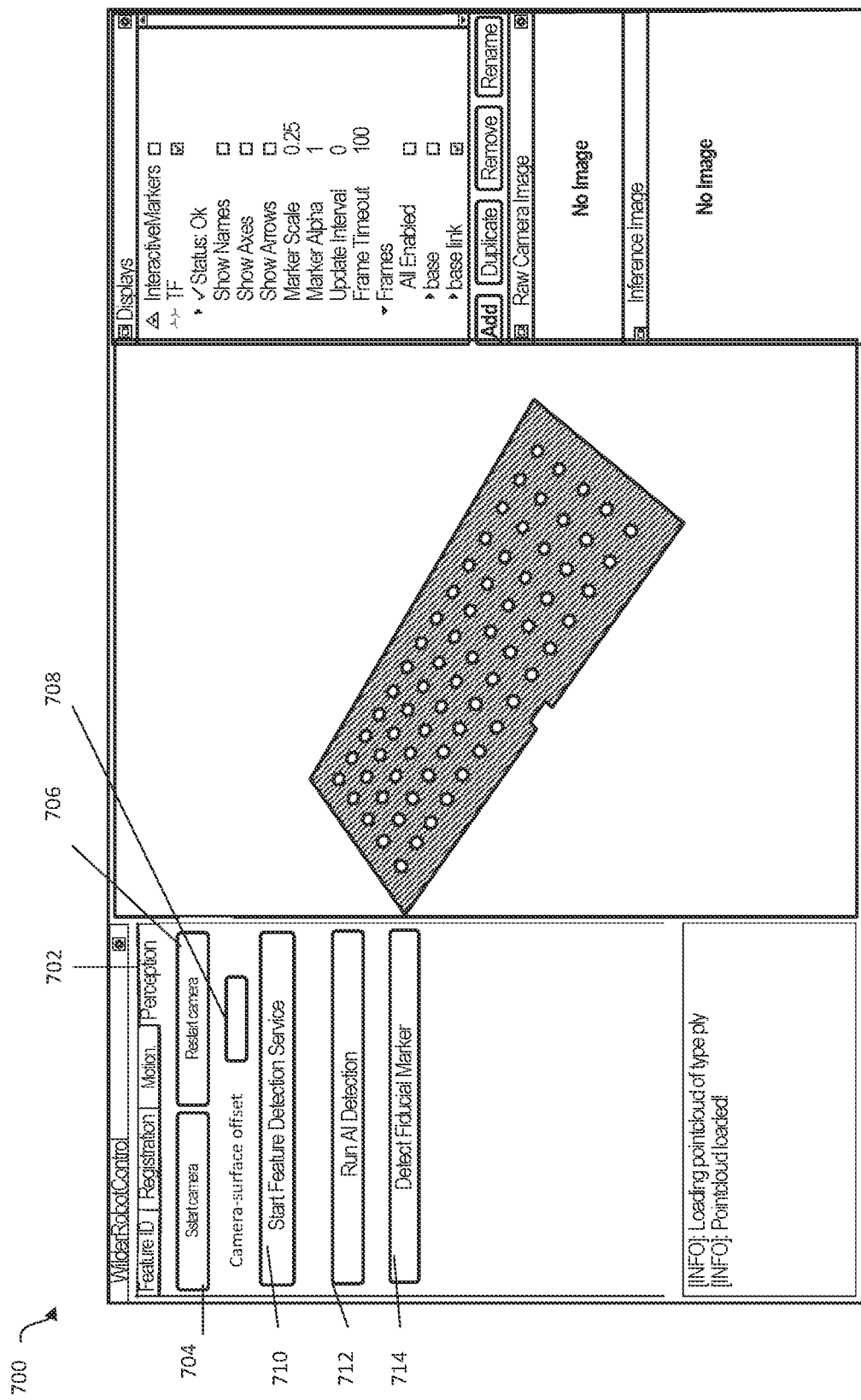
FIG. 7 is an illustration of a UI for guiding a robot, in accordance with one or more embodiments.

FIG. 7 is an illustration of a UI 700 for guiding a robot, in accordance with one or more embodiments. The perception page 702 of the UI 200 can include a start camera button 704 and a restart camera button 706. Additionally, a user can input a camera parameter, such as a camera surface offset 708. The start camera button 704 can be for initiating the camera. The restart camera button can be for restarting a camera. As described above, a display selection pane can further include a raw camera image window for presenting video. For example, if the robot included an image capturing device, the raw camera image window could display a real-time streaming of images captured by the device. The real time images can correspond to a visualization being displayed on the UI 700. The perception page 702 can further include a start feature detection service button 710. As described above, the application can detect features (e.g., holes or fasteners) on the surface of a target object. The start feature detection service button 710 can initiate a service to detect features on the surface of the target object.

The perception page 702 can further include a run artificial intelligence (AI) detection button 712 for executing the AI feature identification algorithm. The application can receive image data of the target objects. For example, the application can receive captured images from the camera initiated by the start camera button 704. In other embodiments, the application can receive data from other sensors, such as a thermal sensor, or spectral sensor. The application can receive the data and use the data as inputs for a neural network, such as a convolutional neural network (CNN). The neural network can receive the data and predict classes for each target. The perception page can further include a detect fiducial marker button 714. As described above, the application can use various methods to generate the working frame. The application can use, for example, a common points method or a fiducial marker method. The detect fiducial marker button 714 can initialize the application to instruct a robot to detect the fiducial markers.

Figure 8:
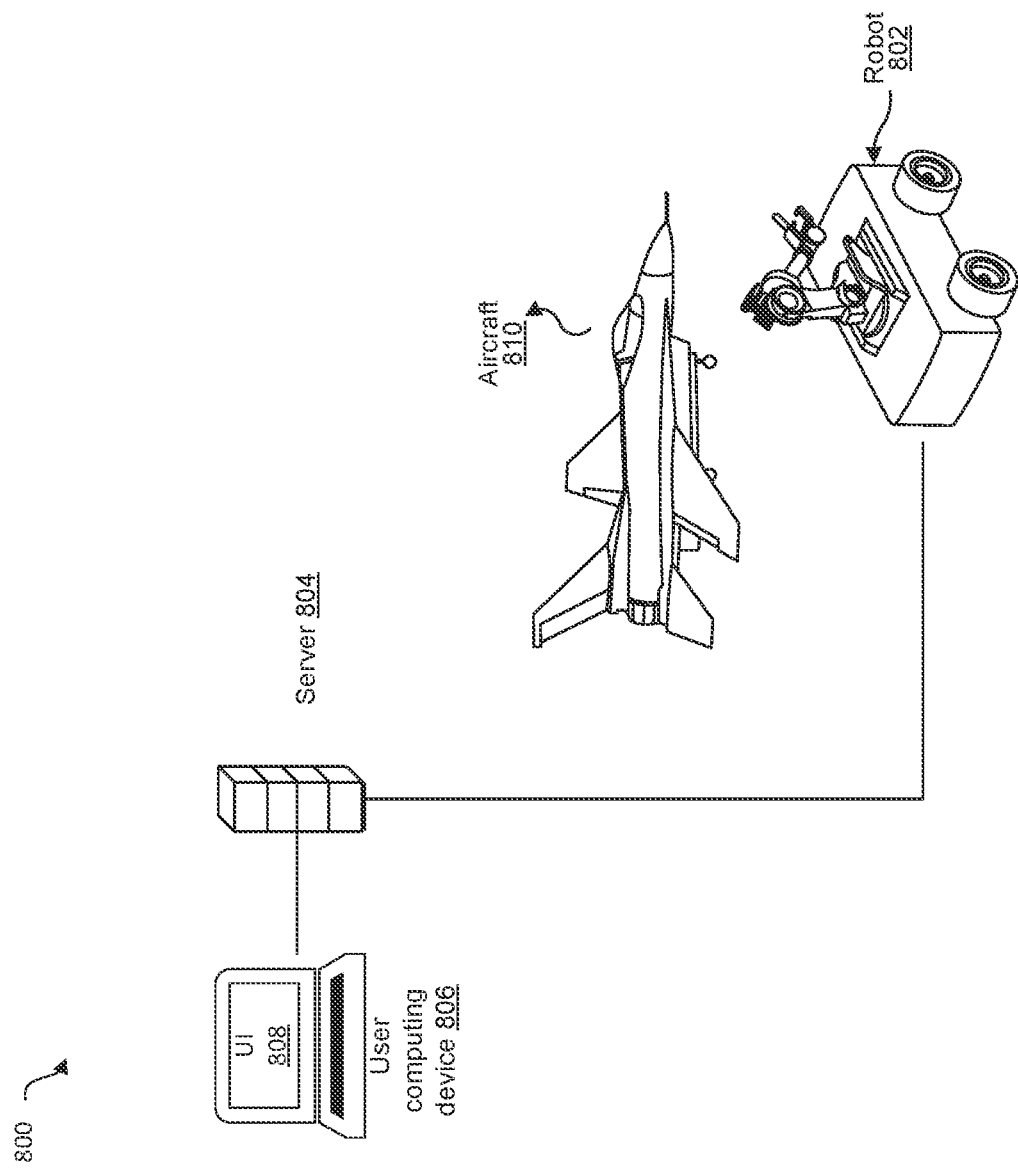
FIG. 8 is an illustration of an environment for using a UI to guide robotic operations, in accordance with one or more embodiments.

FIG. 8 is an illustration 800 of an example of an environment for using a UI to guide robotic operations, in accordance with one or more embodiments. The environment 800 can include a robot 802, a server 804, and user computing device 806 for accessing a UI 808. The robot 802 can be in operable communication with the server 804 that, in turn, can be in operable communication with the user computing device 806. The server 804 can be located at the same premises as the robot 802 or the server 804 can be located remotely from the robot 802. A user can engage with the UI 808 to transmit messages to and from the server 804, which can, in turn, transmit and receive messages to and from the robot 802. The robot 802, the server 804, and the user computing device 806 can be configured to permit the robot to perform autonomous operations on an aircraft 810 and or parts thereof (e.g., wings fuselage) or another real-world object. The autonomous operations can include, for example, removing or installing fasteners for the aircraft 810, decontamination of the aircraft 810, and painting the aircraft 810. It should be appreciated that as illustrated the user computing device 806 can communicate with the robot 802 via the server 804. In other embodiments, the user computing device 806 can communicate directly with the robot 804, and further the user computing device 806 performs the below described functionality of the server 804.

The robot 802 can navigate to the operational area and, once thereat, perform a set of operations to register the aircraft 810 (or a part thereof) to then perform another set of operations on the aircraft 810 (and/or the airplane part). Some of these operations can be computationally expensive (e.g., a feature identification phase, registration phase, path and trajectory generation phase), whereas other operations can be less computationally expensive and more latency sensitive (e.g., drilling a fastener hole operation). The computationally expensive operation(s) can be offloaded to the server 804, whereas the remaining operation(s) can be performed locally by the robot 802. Once the different operations are completed, the robot 802 can autonomously return to a parking area or can be summoned to another operational area.

In an example, a robot 802 can include a movable base, a power system, a powertrain system, a navigation system, a sensor system, a robotic arm, an end effector, input and output (I/O) interfaces, and a computer system. The end effector can support a particular autonomous operation (e.g., drilling) can be a line-replaceable unit with a standard interface, such that the end effector can be replaced with another one that supports a different autonomous operation (e.g., sealing). The end effector replacement can be carried by the robot 802 itself or can use a manual process, where an operator can perform the replacement. The I/O interfaces can include a communication interface to communicate with the server 804 and the user computing device 806 based on input selections at the UI 808 for selection of autonomous operations to be performed by the robot 802. The computer system can include one or more processors and one or more memory storing instructions that, upon execution by the one or more processors, configure the robot 802 to perform different operations. The instructions can correspond to program codes for the navigation, controls of the power system, controls of the powertrain system, the collection and processing of sensor data, the controls of the robotic arm, the controls of the end effectors, and/or the communications.

The robot 802 can include light detection and ranging (LiDAR) sensors to emit a pulsed laser towards the aircraft 810. The LiDAR sensors can further be configured to collect reflected signals from the aircraft 810. The LiDAR sensors can determine an angle of reflection of the reflected signal and a time elapse (time-of-flight) between transmitting the signal and receiving a reflected signal to determine a position of a reflection point on the surface of the aircraft 810 relative to the LiDAR sensors. The robot 802 can continuously emit laser pulses and collect reflection signals. The robot 802 can transmit the sensor data to the server 804, which can further generate a point cloud of the aircraft 810. The point cloud can be displayed on the UI 808 through a visualization pane. In other instances, the server 804 can retrieve a stored point cloud of the aircraft 810 from a database.

The server 804 can be a hardware computer system that includes one or more I/O interfaces to communicate with the robot 802 and with the user computing device 806, one or more processors, and one or more memory storing instructions that, upon execution by the one or more processors, configure the server 804 to perform different operations. The instructions can correspond to program codes for the communications and for processes to be executed locally on server 804 for the robot 802 given data sent by the robot 802.

The user computing device 806 can be a hardware computer system that includes one or more I/O interfaces to communicate with the server 804 and with the robot 802. The user computing device can include a display for displaying the UI 808. The user computing device can further include one or more input interfaces (e.g., a mouse, a keyboard, a touch screen) for receiving user inputs into the UI 808.

In response to one or more inputs at the UI 808, multiple operations may be needed to be performed and inter-dependencies between these operations may exist. For instance, to identify fasteners and/or drill fastener holes on an aircraft 810, the robot 802 can detect targets (e.g., holes), register the aircraft 810 so that it can be located in a local coordinate system of the robot 802, control the robotic arm to move to the locations according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end-effector). As such, the server 804 can execute processes for the computationally expensive/less frequently performed operations, whereas the robot 802 can locally execute processes for the remaining operations.

In some instances, a user can engage the UI 808 and select one or more inputs for controlling the robot 802. The user computing device 806 can receive the inputs and transmit a message including the inputs to the server 804. The server can include an application for performing one or more operations to control the robot 802. The server 804 can receive and transmit messages to and from the robot 802. The messages can include operational instructions generated based on inputs to the UI 808. For the local operations, the robot 802 can execute the corresponding processes locally and can inform the server 804 of the results of these local operations (e.g., that a fastener hole was drilled at a particular location on the aircraft 810). The server 804 can transmit a message to the user computing device 806, where the message can include control instructions for updating a visualization displayed at the UI 808.

Figure 9:
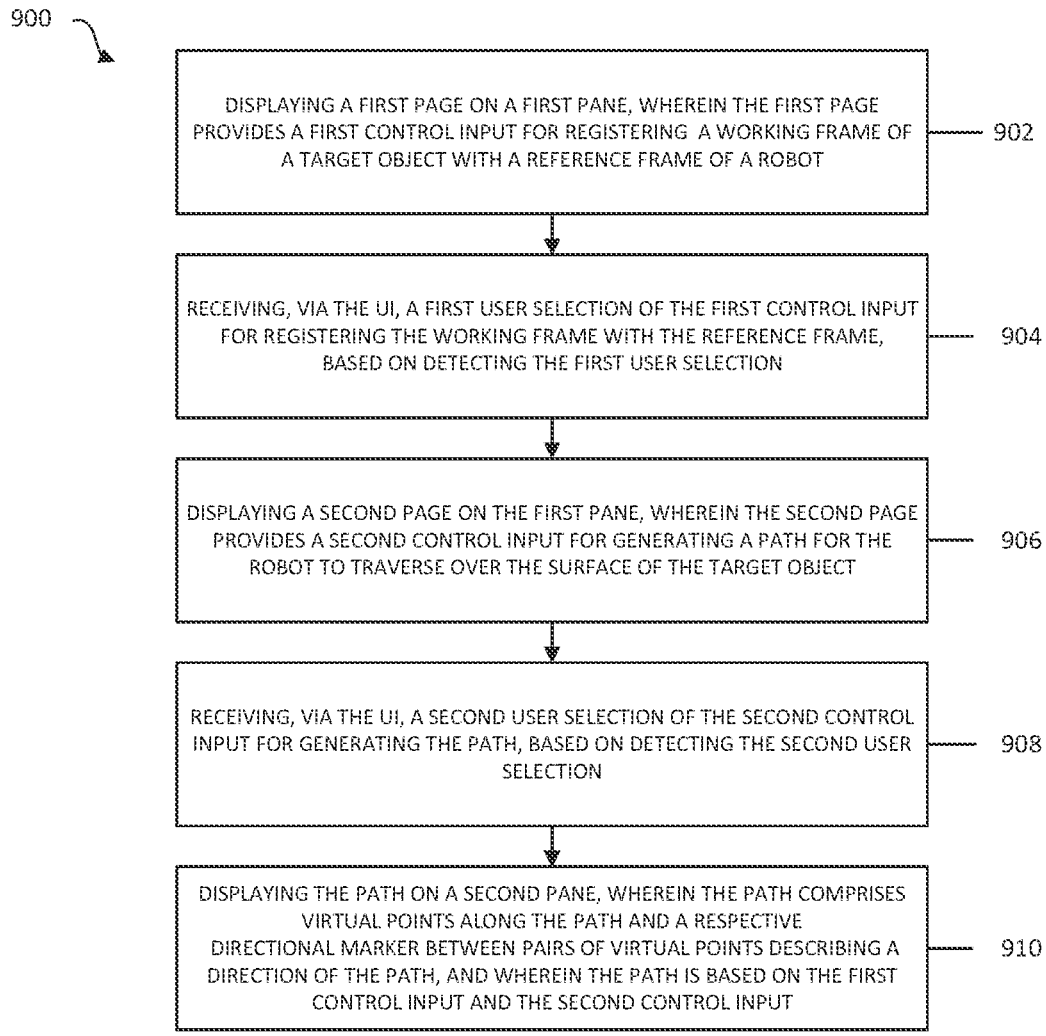
FIG. 9 is a process flow for guiding a robot using a UI, in accordance with one or more embodiments.

FIG. 9 is a process flow 900 for guiding a robot using a UI, in accordance with one or more embodiments. At 902, the method can include a computing device, such as a user computing device, displaying a first page on first pane, wherein the first page provides a first control input for registering a working frame of a target object with a reference from a robot. The UI can be an interface between a user and an application executing on a computing device, such as a server. The first page can be a registration page and registration can include calculating a transfer function to transform the coordinate system of the target object to the coordinate system of the robot. The UI can display a three-dimensional representation of the target object on a second pane, such as a visualization pane. The UI can further include visual markers indicating that the target object is registered, such that the coordinate system of the target object can be transformed into the coordinate system of the robot.

At 904, the method can include receiving, via the UI, a first user selection of the first control input to register the working frame with reference frame, based on detecting the first user selection. A computing device can further receive, via the UI, an indication that the user has selected the control input based on the detections. In some instances, the user can have manually inputted parameter values for registering the target object. In these instances, the computing device can further receive the parameter values based on the detection.

At 906, the method can include the UI displaying a second page on the first pane, wherein the second page can provide a second control input for generating a path for the robot to traverse the surface of a be a motion plan page and the path can include a set of generated virtual points and directions reaching each subsequent virtual point to traverse the surface of the target object. The second control input can be, for example, a compute path button that a user can click to generate a path over the surface of the target object.

At 908, the method can include the computing device receiving, via the UI, a second indication of a second user selection of the second control input for generating the path to the computing device. The UI can detect a user selection of the second control input. For example, the UI can detect the user selecting the Compute Path button. Based on the detection, the computing device can receive an indication of the selection to the computing device.

At 910, the method can include the UI displaying the path on a second pane, wherein the path comprises virtual points along the path and a respective directional marker between pairs of virtual points describing a direction of the path. The second pane can be a visualization pane and be adjacent to the first pane.

Figure 10:
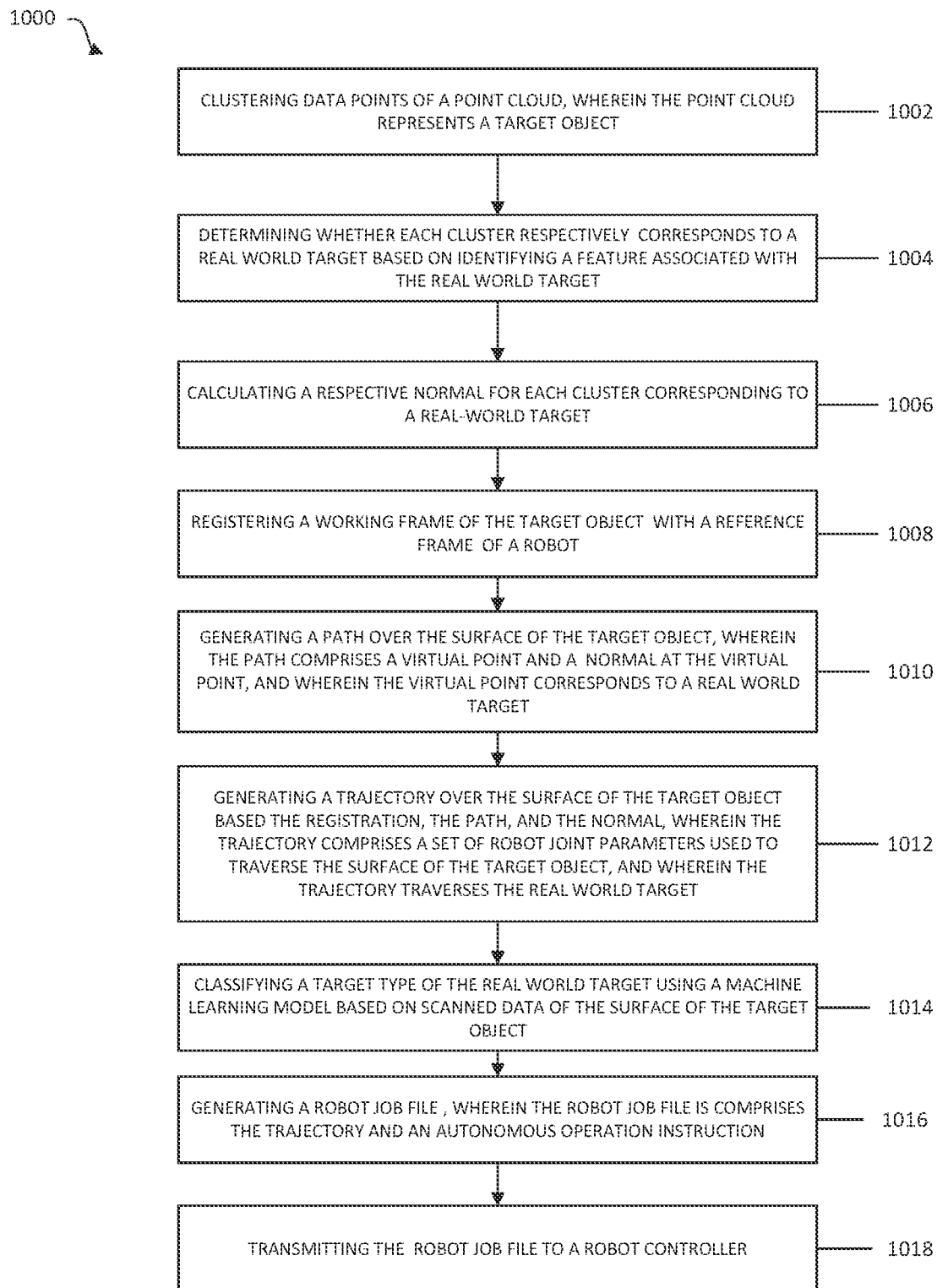
FIG. 10 is a process flow for guiding a robot, in accordance with one or more embodiments.

FIG. 10 is a process flow 1000 for guiding a robot, in accordance with one or more embodiments. At 1002, the method can include a computing device, such as a server or user computing device, clustering points of a point cloud, wherein the point cloud corresponds to a target object. The computing device can receive a point cloud of a target object, such as an aircraft, vehicle, or other structure. In some instances, the computing device can retrieve a point cloud of a target object from a repository based on the specifications of the target object. The computing device can further enter a clustering or segmentation phase and generate clusters or clusters based on a first input. In addition to receiving an indication to generate clusters, the computing device can receive user-defined clustering or segmentation parameters. The user can enter clustering or segmentation parameters into a UI and the UI can transmit the parameters to the computing device. The computing device can translate the indication to generate clusters and the parameters into instructions for clustering data points of the point cloud.

At 1004, the method can include determining whether each cluster or segment represents a real-world target based on identifying a feature corresponding to a real-world target. The feature can be associated with a feature of a real-world object, such as circular patterns for a hole or fastener. The computing device can extract features from each cluster to determine whether the cluster includes a set of desired features. For example, the computing device can determine whether the clusters have a circular shape. The computing device can further identify clusters that include the desired features as targets.

At 1006, the method can include the computing device calculating a normal for each cluster corresponding to a real-world target. The computing device can generate waypoints utilizing a series of algorithms. The waypoints are virtual points located at the targets that can be used to generate a path and trajectory over the surface of the target object. The waypoints can also be used to guide the robot towards or away from a point on the surface of the target object. The number of waypoints can be configured by a user, based on various parameters. For example, the user can select a number of waypoints based on the shape of the surface of the target object, the number of targets, or the size of the target object. The computing device can further calculate the normal extending to or from each waypoint.

At 1008, the method can include the computing device registering a working frame of the target object with a reference frame of the robot. This can include calculating a transfer function for associating a reference frame of the target object to a frame of the base of the robot. In other words, registration can include determining the location of the robot with respect to the target object. In some instances, the user can mark multiple targets on the real-world object and on a computer representation of the object. The user can further direct the robot to each of the targets to determine a positional relation of each marked target object to a tool center point (TCP) of the robot. The robot can transmit the positional relationship data back to the computing device. Based on the positional relationship data, the computing device can calculate a transfer function for modeling a relationship between a position of the robot and a location on the target object in the coordinate system of the robot.

At 1010, the method can include the computing device generating a path over the surface of the target object, wherein the path comprises a set of virtual points and a respective normal at each virtual point, and wherein each virtual point corresponds to a real-world target. The computing device can generate a path over the surface of the target object based on the waypoints. The path can be a collection of three-dimensional movements that traverse the surface of the target object. The path can be robot agnostic and does not necessarily take into consideration the limitations of the robot. The path can cover the entirety of the surface of the target object or a portion of the surface of the target object. While the waypoint generation step creates a waypoint to use as a basis for a path, the waypoints are not ordered to provide an indication of how the path should proceed. One technique to order the waypoints is to minimize a desired parameter such as execution time or path length. The computing device can minimize the path length by taking the waypoint graph as an input into an optimization technique (e.g., a traveling salesman problem (TSP) optimization algorithm). The computing device can use the output of the optimization technique to determine the path across the waypoints. In other embodiments, the computing system can employ other optimization techniques, such as graph-based techniques, or other appropriate techniques.

At 1012, the method can include the computing device generating a trajectory over the surface of the target object based on the registration, the path, and each respective normal, wherein the trajectory comprises set of robot joint parameters used to traverse the surface of the target object, and wherein the trajectory traverses the surfaces of the real-world target. The computing device can translate the path into a trajectory for moving the robot in real life. The trajectory can consider, for example, the available motions of the robot, a desired pose of the end effector in relation to the surface of the target object, and avoidance of collisions with the target object. It should be appreciated that as the end effector moves over the surface of the target object, the entire robot may need to move to avoid a collision. The computing device can consider anticipated changes in the relative positions of the target object and the robot in generating the trajectory. In some instances, the computing device may need to repeatedly generate trajectories to reach a location of the target object or avoid collisions.

The computing device can use inverse kinematics to calculate the trajectory. Inverse kinematics is a process that takes the desired pose of the robot arm and determines a position for each of the robot's components (e.g., base, the upper arm, the elbow the lower arm, the wrist, and the end effector). Through inverse kinematics, the computing device can determine a configuration of the components to effectuate the desired pose of the robot. The computing device can apply various approaches for inverse kinematics, such as a closed-form solution approach or an optimization approach. Once the computing device determines the desired position for each of the above-referenced components, the computing device can determine a motion for each of the components to reach the desired position. The robot can be actuated to move about each of its axes to enable multiple degrees of freedom (DoF), and multiple configurations can lead to the desired pose, a phenomenon known as kinematic redundancy. Therefore, the computing device can apply an optimization technique to calculate an optimal motion for each component to reach the desired position.

The computing device can further identify one or more continuous trajectories that are collision free by employing various techniques to avoid collisions with obstacles by optimizing certain criteria. The computing device can simulate candidate trajectories and based on the registration and determine whether any robot component will collide with another object. If a candidate trajectory will result in a collision, the computing device can move on to a next candidate trajectory until it identifies a trajectory without a collision. The computing device can store collision data based on past collisions or past calculations. The computing device can further eliminate candidate trajectories based on the stored collision data. For example, the computing device can compare candidate trajectories to collision data to determine whether a collision is likely. If a collision has a probability less than the threshold probability, the candidate trajectory can be eliminated. If, however, a collision has a probability greater than a threshold probability, the candidate trajectory is not eliminated.

At 1014, the method can include the computing device classifying a real-world target type using a machine learning model based on scanned data of the surface of the target object. The computing device can receive image data of the target objects. For example, the computing device can transmit the trajectory to the robot with instructions to capture image data of the targets. The computing device can receive the image data and use the data as inputs for a neural network, such as a convolutional neural network (CNN). The neural network can receive the images and classes for each target. For example, the neural network can predict a class for each target such as fastener type, fastener diameter, or fastener material.

At 1016, the method can include the computing device generating a robot job file, where the robot job file comprises the trajectory, and an autonomous operation instruction. The computing device can convert trajectory, instructions for executing an end effector, and other relevant information into a file formatted to be executable by the robot. The robot job can identify target classes and include instructions for each class. For example, the robot job can instruct the robot to perform certain operations for certain fastener types and other operations for other fastener types. At 1018, the method can include the computing device transmitting the robot job file to a robot controller.

Figure 11:
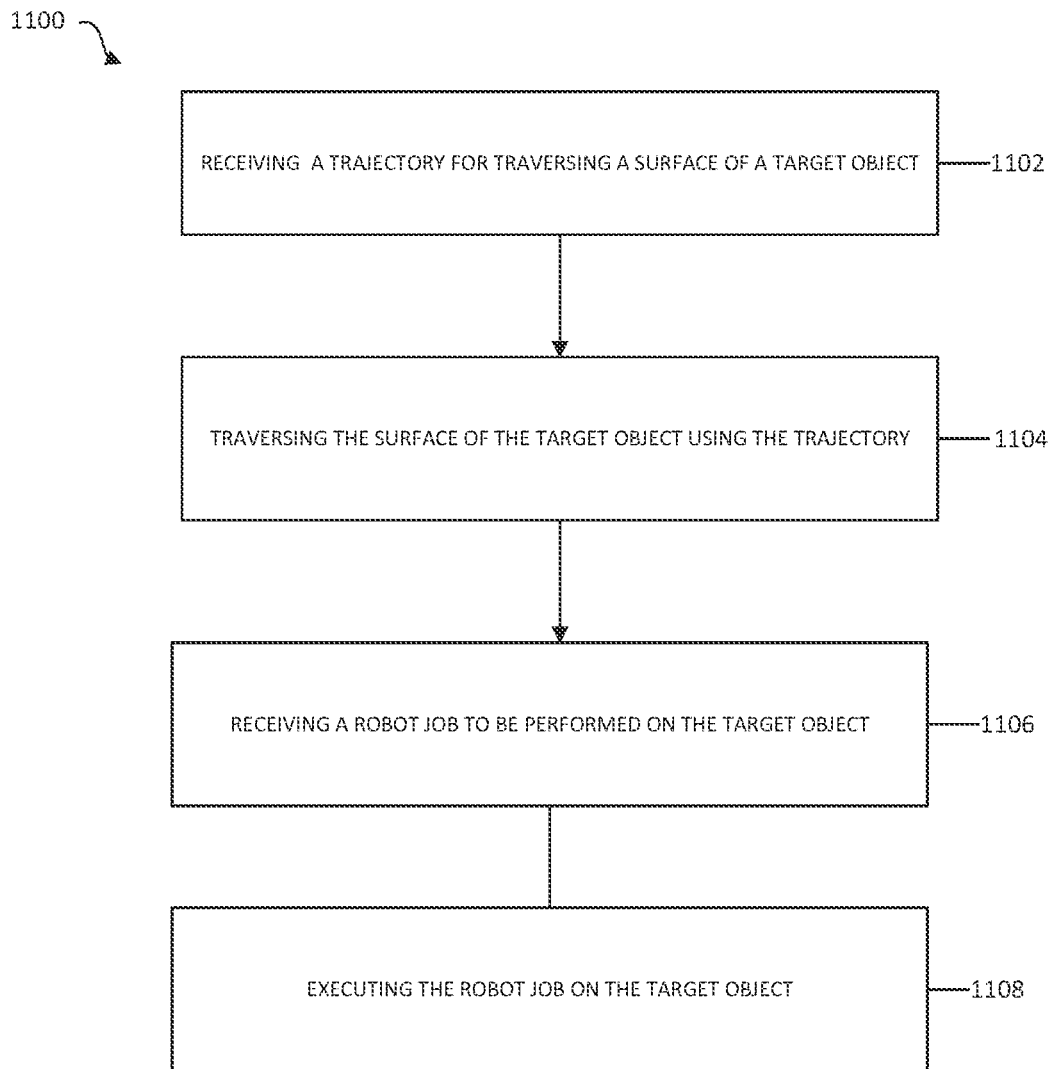
FIG. 11 is a process flow for guiding a robot, in accordance with one or more embodiments.

FIG. 11 is a process flow 1100 for executing an autonomous operation by a robot. At 1102, the method can include the robot receiving a trajectory for traversing a surface of a target object. The robot can receive the trajectory from a server, such as the server that calculated the trajectory.

At 1104, the method can include the robot traversing the surface of the target object using the trajectory. In addition to traversing the surface, the robot can be collecting data, such as image data from the surface of the target object. For example, the robot can include an image capturing device to capture images of the surface of the target object. The image data can include images of the targets to be used for classification of the targets. The image data can also be transmitted back to the server to be displayed on a UI in real-time.

At 1106, the method can include the robot receiving a robot job to be performed on the target object. The robot job can include instructions for performing an operation (e.g., drilling) on at least one target on the surface of the target object. The robot job can be configured based on the trajectory, the robot's limitations, the intended job, and classification of the targets. In some embodiments, the robot job further includes a recalculated trajectory for traversing the surface of the target object. At 1108, the method can include the robot executing the robot job on the target object.

Figure 12:
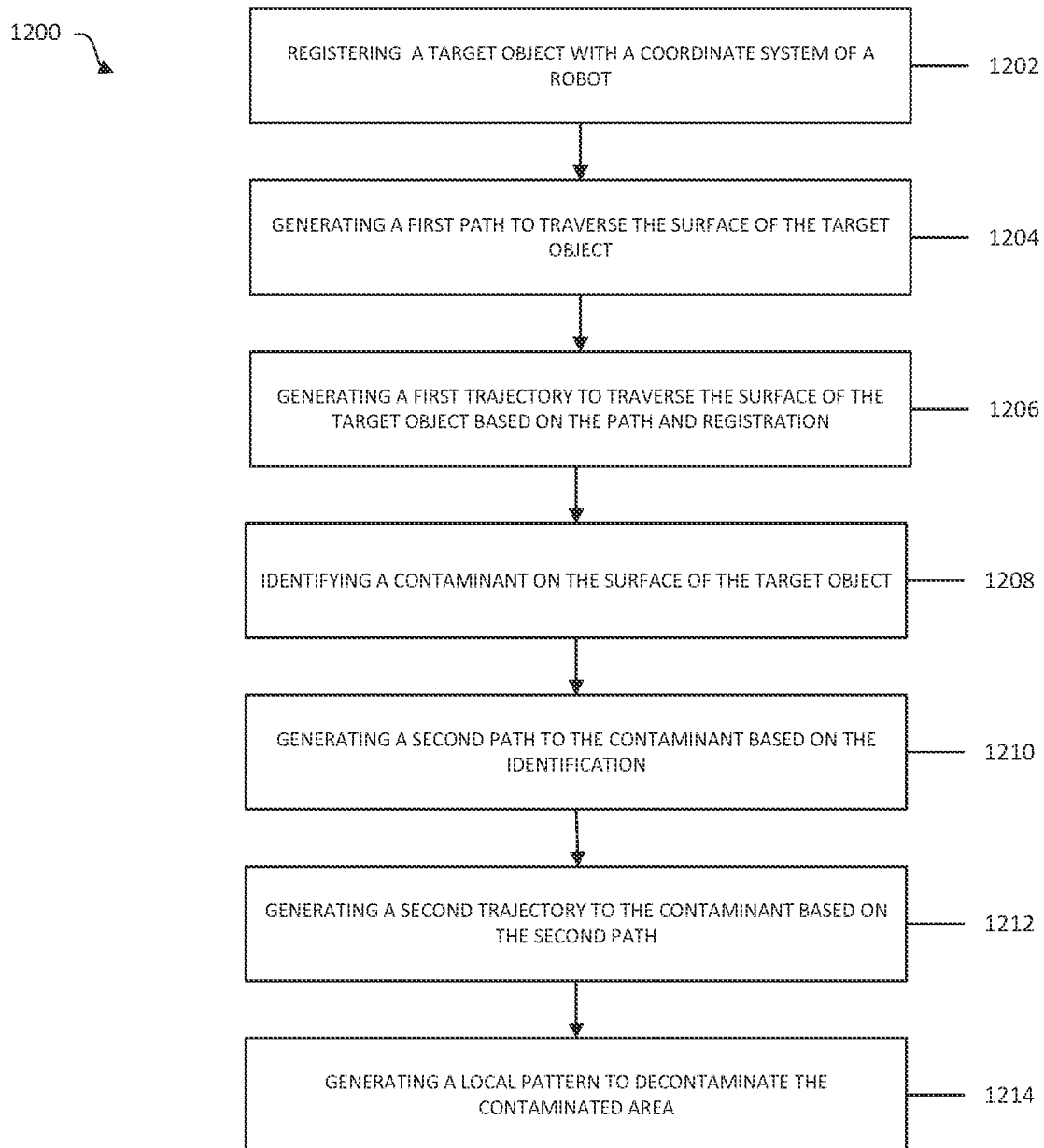
FIG. 12 is a process flow for guiding a robot, in accordance with one or more embodiments.

FIG. 12 is process flow 1200 for decontamination of a target object, in accordance with one or more embodiments. FIG. 11 is provided as an illustration that the above described systems and steps can be used for processes other than inspecting holes, drilling holes, or removing fasteners. At 1202, the method can include a computing device registering a target object to a coordinate system of a robot. The computing device can be a server guided by user selections at a UI. For example, through the UI, the user can instruct the server to load a point cloud of a target object and identify targets on the surface of the target objects. The user can further use the UI to instruct the server to generate waypoints on a three-dimensional representation of the target object. The waypoints can be movable virtual makers that can be used to generate normals extending to and from the waypoints. The waypoints can further be used as points to generate a path. The user can further use the UI to register the target object to the coordinate system of the robot, and in particular the base of the robot.

At 1204, the method can include the computing device generating a path to traverse the surface of the target. The user can use the UI to select an input control to send instructions to the computing device to generate the path. To generate the path, the computing device can generate waypoints utilizing a series of algorithms. The waypoints are virtual points on the surface of the target object that can be used to generate a path over the surface of the target object. The computing device can further employ an optimization algorithm (e.g., TSP solver) to identify an optimal path over the surface of the target object. As described above, the user can use the UI to move one or more waypoints and therefore, the path can be generated above, on, or below the surface of the target object based on a user's positioning of the waypoints. The path can be robot agnostic to be usable by multiple robots. The generated path can further be stored in a database to be retrieved later. For example, the path can be reused for a subsequent robot operation on the target object.

At 1206, the method can include the computing device generating a first trajectory to traverse the surface of the target object based on the path and the registration. The user can use the UI to select an input control to send instructions to the computing device to generate the trajectory. The trajectory can be a set of movements for each robot component to follow the path while accounting for the limitations of the robot, and avoidance of collisions. The computing device can generate the trajectory based on implementing inverse kinematics techniques. The computing device can use inverse kinematics to generate a trajectory that guides the robot in real life such that the end effector has a desired pose along the trajectory. As described above, the computing device can generate a respective normal at each target using the waypoints. The normal can be used to properly guide the robot to approach and recede from a target at the correct orientation. The computing device can further transmit the trajectory to the robot to follow. For example, the computing device can transmit the trajectory with instructions to scan the surface of the target object with a sensor, such as an image capturing device or a sniffer. The scanned data can be based on the sensor used to collect the data. For example, the scanned data can be images collected by an image capturing device. In other instances, the scanned data can be measured of one or more characteristics of the surface of the target object or a material on or in the surface of the target object. The scanned data can further be presented to the user via the UI. For example, the UI can include a visualization pane for displaying the scanned data. In some instances, the scanning can be performed by the robot, and the UI can present the scanned data in real-time for the user.

At 1208, the method can include the computing device identifying a contaminant on the surface of the target object. The user can use the UI to select an input to send instructions to the computing device to identify a contaminant. The computing device can format the data for use with a neural network (e.g., CNN, gated recurrent unit (GRU) network, long short-term memory network (LSTM)) and use the network to identify the contaminant. The UI can display the identified contaminant for the user. In other instances, rather than or in addition to receiving the identification, the user can view the scanned data on the visualization pane and manually input an identification of the contaminant into the UI.

At 1210, the method can include the computing device generating a second path to the containment based on the identification. The user can use the UI to select an input to send instructions to generate the second path. In some instances, the robot end effector is situated above the contaminant after scanning the surface of the target object, and in other instances, the robot end effector is situated away from the contaminant after scanning the surface of the target object. Therefore, the computing device can generate a second path from the position of the end effector to the contaminant. The second path can be generated using waypoints in the same manner as the path. However, unlike the first path, the second path is not interested in traversing the surface of the target object. Rather the second path is concerned with an optimum path for reaching the contaminant. Similar to the first path, the second path is robot agnostic and can be stored in a database for reuse.

At 1212, the method can include the computing device generating a second trajectory based on the second path. The user can use the UI to select an input to send instructions to generate the second trajectory. The computing device can use inverse kinematic techniques to determine the respective motions for the robot components to follow to reach the contaminated area, and account for the robot's limitations, while avoiding collisions. The robotic arm can follow the trajectory and move the tool to the contaminated area. Although the trajectory is not robot agnostic, the second trajectory can also be stored in a database for reuse.

At 1214, the method can include the computing device generating a local pattern to decontaminate the contaminated area. The user can use the UI to select an input to send instructions to generate the local pattern. The local pattern can include any sequence of movements for applying or dispensing a decontamination solution on the contaminated area. The pattern can be effectuated by a motion of the end effector, a motion of the robotic arm, or a combination of a motion of the end effector and a motion of the robotic arm. The local pattern can be based on, for example, the contaminant, the solution used to remove the contaminant, the surface of the target object, or a combination thereof. The local pattern can be, for example, a raster pattern, concentric circles, or other pattern.

In some instances, the computing device can further verify that decontamination operation resulted in the decontamination of the target object. The computing device can cause the robotic arm to move a sensor (e.g., sniffer sensor) over the contaminated area and determine whether it can detect a contaminant. In other instances, the computing device can cause the robotic arm to move a sensor over the contaminated area, and transmit the collected data to a neural network, such as the neural network used to identify the contaminant. The neural network can be trained to process the sensor data and determine whether a contaminant is present on the target object. If either method results in a conclusion that the contaminant remains, the computing device can reinitiate decontamination.

Figure 13:
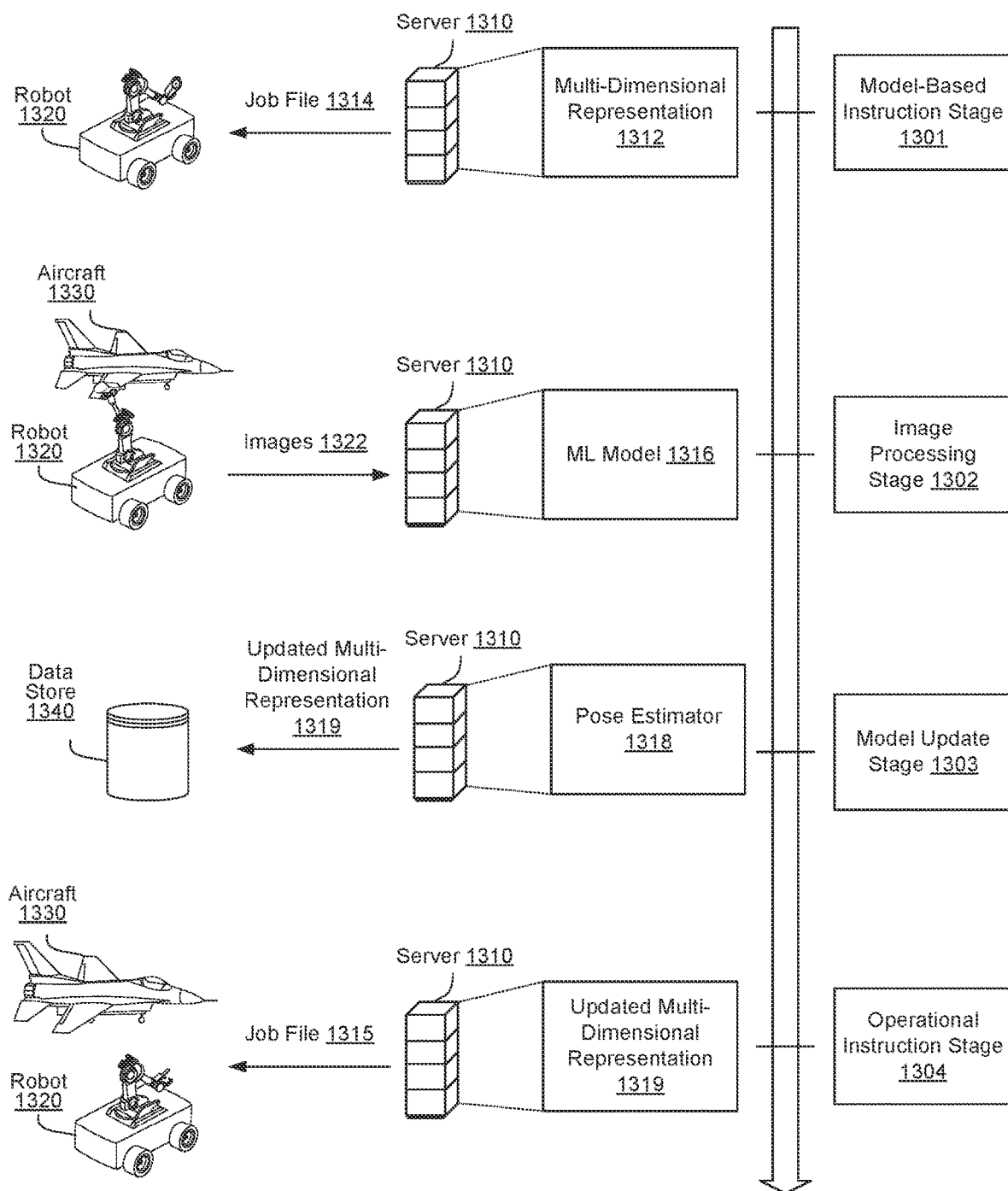
FIG. 13 is an illustration of an environment for using artificial intelligence to model a target object, in accordance with one or more embodiments.

FIG. 13 is an illustration of an environment for using artificial intelligence to model a target object, in accordance with one or more embodiments. In an example, the target object is an aircraft part, although the embodiments similarly apply to other types of target objects. The aircraft part includes a plurality of targets, such as fasteners, although the embodiments similarly apply to other types of targets. Each target can have a target type, such as a fastener type.

A multi-dimensional representation of the aircraft part can exist, such as a three-dimensional model of the aircraft part. This multi-dimensional representation may be generated and stored in a data store according to the techniques described herein above. Generally, the multi-dimensional representation includes a multi-dimensional modeling of each target included in the aircraft part. For example, each target corresponds to a modeled target in the multi-dimensional representation. Pose data (e.g., position and orientation) of each modeled target can be stored in the multi-dimensional representation. This pose data can be defined in a working frame (e.g., in a first coordinate system of the aircraft part). Other types of data can also be stored, such as size data, geometry data, and the like.

Artificial intelligence techniques can be used to generate an updated multi-dimensional representation based on the multi-dimensional representation, where the updated multi-dimensional representation can include, as applicable, more accurate pose data corresponding to each target of the aircraft part. To do so, the artificial intelligence techniques involve using a machine learning model in the processing of images, each showing at least one target of the aircraft part and generated based on positioning a camera relative to the aircraft part. The positioning can be based on the multi-dimensional representation. The output of the machine learning model can indicate, for each target, at least position data. The output also indicates, for each target, a target type classification and/or visual inspection property. The position data can be used to generate updated pose data and this updated pose data can be included along with, as applicable, the classification type and/or visual inspection property in the updated multi-dimensional representation.

In the illustration of FIG. 13, the artificial intelligence techniques are illustrated using multiple stages. Each of these stages is described herein next.

In a model-based instruction stage 1301, a server 1310 can receive a multi-dimensional representation 1312 of an aircraft part. The server 1310 can be the same as the server that implements the techniques described herein above for generating the multi-dimensional representation 1312. Receiving the multi-dimensional representation 1312 can include retrieving the multi-dimensional representation 1312 from a data store local to or remote from the server 1310. In also this model-based instruction stage 1301, the server 1310 can generate a robot job based on the multi-dimensional representation 1312 in a similar way to the techniques described herein above. In particular, the robot job indicates either a path to traverse a surface of the aircraft part to visit each of the targets of the aircraft part and/or a trajectory for controlling operations of a robot 1320 such that each target is visited. In this case, the robot 1320 can be equipped with a camera (e.g., the camera is attached thereto as an end effector), and the camera can be set as a TCP. The robot job can be sent to the robot 1320 as a robot file 1314.

Depending on the computing capability of the robot 1320, it is possible that the robot 1320, rather than the server 1310, may generate and/or receive the multi-dimensional representation 1312. Further, it is possible that the robot 1320 may generate the robot job and/or the trajectory.

In an image processing stage 1302, the robot 1320 moves the camera based on the job file 1314 to image the aircraft part (e.g., a wing of an aircraft 1330). For example, the aircraft part is registered to the robot 1320 such that the aircraft part can be localized in a reference frame of the robot 1320 (e.g., in a second coordinate system of the robot 1320). The multi-dimensional representation 1312 can indicate a pose of a target of the aircraft part, where this pose is defined in the working frame. Based on forward kinematics, this pose can be redefined in the reference frame of the robot. Using the camera as a TCP and the redefined pose, the camera can be positioned to be at a predefined distance from the target (e.g., 1 cm or some other distance that may be a function of the focal length of the camera) and at a relative orientation relative to the target (e.g., the focal length distance being normal to a surface of the target) based on inverse kinematics.

As explained herein above, inverse kinematics includes a process of computing the variable joint parameters needed to place the end of a kinematic chain (e.g., the camera of the kinematic chain that includes the robot's 1320 arm and its components), at a given position and orientation relative to the start of the chain (e.g., the origin of the local coordinate system). Forward kinematics involves using kinematic equations to compute the position of the camera from specified values for the joint parameters. Whereas inverse kinematics takes as input the Cartesian camera position and orientation (e.g., as defined in the local coordinate system and corresponding to the TCP) and calculates joint angles, forward kinematics (for the arm) takes as input joint angles and calculates the Cartesian position and orientation of the camera. Through inverse and forward kinematics, the robot 1320 can determine a configuration of its base, arm components, and camera to effectuate the desired pose of the arm and camera relative to the target. The robot 1320 can apply various approaches for inverse and forward kinematics, such as a closed-form solution approach or an optimization approach. The arm and the camera can be actuated to move about each of their axes to enable multiple DoF, and multiple configurations can lead to the desired pose, a phenomenon known as kinematic redundancy. Therefore, the robot 1320 can apply an optimization technique to calculate an optimal motion for each component to reach the desired pose.

Once the camera is at a desired pose relative to a target of the aircraft part (e.g., such that this target is in a center of the field of view of the camera and that a surface thereof is normalized relative to the camera), the camera can generate one or more images that show the target. For example, upon detecting that the camera has reached the desired pose based on the arm and camera actuations, the robot 1320 can instruct the camera to generate an image. Images 1322 of the different targets can accordingly be generated and sent to the server 1310.

Based on each image showing a target, the server 1310 can generate an input to an ML model 1316. The input can be, for instance, the image itself or a processed version of the image (e.g., by using cropping, blur reduction, brightness increase, or any other image processing techniques applied to the image). The server 1310 can execute program code for an ML model 1316 and can provide the input for the execution (although it may be possible that the ML model 1316 can be hosted on a different computer system, such as a cloud service, and can be accessible to the server 1310 via an application programming interface (API) call). An output of the ML model 1316 is then generated. In an example, the camera is a two-dimensional camera. In this example, an image showing a target is two-dimensional. The output indicates two-dimensional position data of a detected target in the image, where the detected target corresponds to the target. In an example, the camera is a three-dimensional camera (e.g., a depth camera). In this example, an image showing a target is three-dimensional. The output indicates three-dimensional position data and orientation data of a detected target in the image, where the detected target corresponds to the target. In an example, the camera is a two-dimensional camera, and a depth sensor is also used to generate depth data. In this example, an image showing a target is two-dimensional. The depth data can indicate a depth per portion of the target (e.g., at a pixel level of the depth sensor). The input can also include such depth data. In this example also, the output indicates three-dimensional position data and orientation data of a detected target in the image, where the detected target corresponds to the target. The ML model 1316 can also be trained to output a classification of the target and/or a visual inspection property based on the input. The position data (e.g., two-dimensional or three-dimensional as the case may be) and, as applicable, the orientation data, can be defined in a camera frame (e.g., a third coordinate system of the camera, such as UV coordinates and rotations). The classification can indicate a target type (e.g., a type of fasteners). The visual inspection property can indicate a property of the target that would have been detected using a visual process that would have physically inspected the target (e.g., to determine corrosion of the fastener, corrosion of an area around the fastener, fastener presence, fastener absence, fastener damage, surrounding area damage, or any other detectable property upon a physical visual inspection).

In a model update stage 1320, the server 1310 can execute program code for a pose estimator 1318 (although it may be possible that the pose estimator 1318 can be hosted on a different computer system, such as a cloud service, and ca be accessible to the server 1310 via an application programming interface (API) call). At least a portion of the output model 1316 is used as input to the pose estimator 1318. For example, for each target, this input can include the position data (e.g., two-dimensional or three-dimensional as the case may be) and, as applicable, the orientation data. If two-dimensional position data for a target is input, the pose estimator 1318 can estimate three-dimensional pose data of the target. This estimation can be based on the predefined distance and orientation of the camera at the time the target was imaged. Based on inverse kinematics, the three-dimensional pose data can be expressed in the coordinate system of the robot 1320 (e.g., the reference frame) and, based on forward kinematics, it can be further expressed in the coordinate system of the aircraft part (e.g., the working frame). If the three-dimensional position data for a target is input, the pose estimator 1318 can update it to be expressed in the coordinate system of the robot 1320 and/or the aircraft path. If no orientation data is available, the orientation of the target can be estimated based on the orientation of the camera at the time of imaging and this orientation can be expressed in the coordinate system of the robot 1320 and/or the aircraft path. If the orientation data is also available, the pose estimator 1318 can update it to be expressed in the coordinate system of the robot 1320 and/or the aircraft path. In any case, the pose estimator 1318 can output pose data (e.g., three-dimensional position data and orientation data) of each imaged and detected target, where this pose data can be expressed in the coordinate system of the robot 1320 and/or the aircraft part.

The server 1310 generates and stores, in a data store 1340, an updated multi-dimensional representation 1319 of the aircraft part. For each detected target, the updated multi-dimensional representation 1319 can include the pose data of the target (e.g., in the coordinate system of the aircraft part) and its classification and/or visual inspection property. In the data store 1340, the updated multi-dimensional representation 1319 can be associated with an identifier of the aircraft part (e.g., a product number) and/or the aircraft (e.g., a tail number).

In an operational instruction stage 1304, the server 1310 can use the updated multi-dimensional representation 1319 to generate a robot job for a set of robotics operations to be performed on the aircraft part (although it may be possible that another computer system may alternatively or additionally do so). For instance, for a particular target type (e.g., fastener type) and/or a particular visual inspection property (e.g., damaged fasteners), the server 1310 can determine a set of targets of the aircraft part and can generate a path to traverse the surface of the aircraft part to visit each of such targets and/or a trajectory based on such a path. The robot job can indicate the path (or trajectory) and an operation (e.g., fastener removal) to perform at each of such targets. The robot job can be sent as a job file 1315 to the robot 1320 (although the job file 1315 can be sent to a different robot). The camera may be replaced with an end effector configured to perform the type of robotics operation (e.g., a fastener drill end effector), whereby the robot 1320 can use this end effector as a TCP to compute the trajectory (if not already available in the job file 1315) and control the movements of the arm and end effector to perform the robotic operations.

Figure 14:
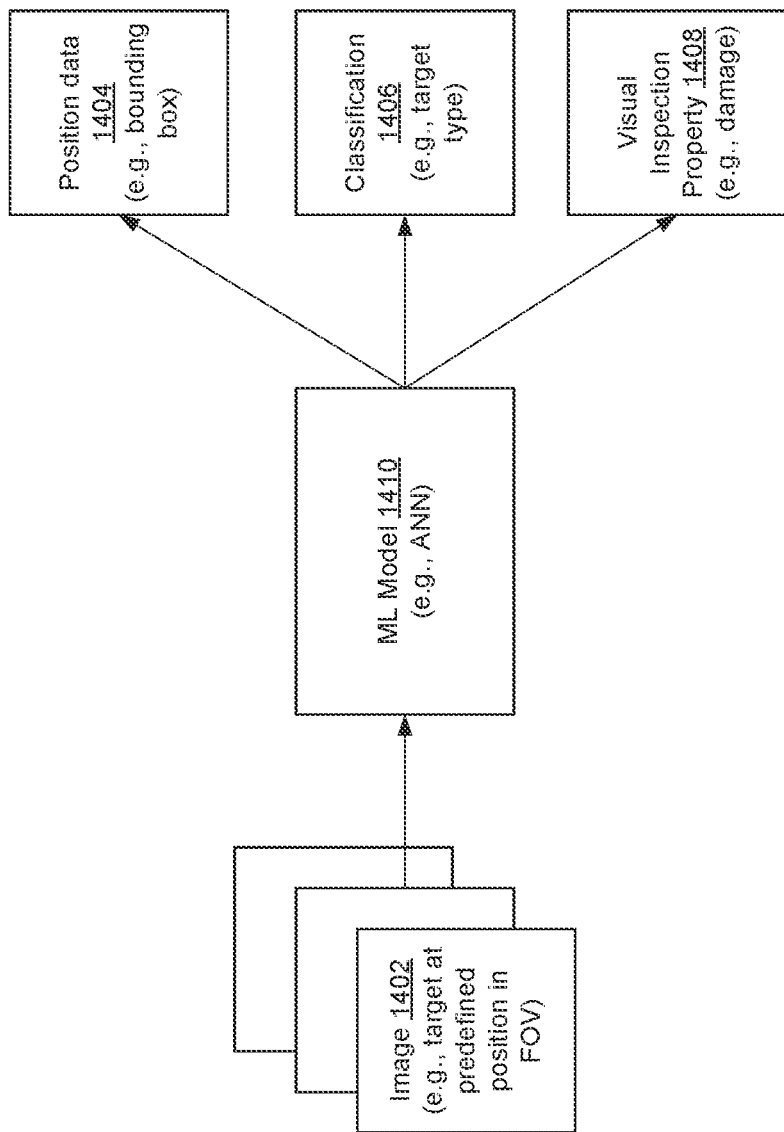
FIG. 14 is an illustration of using a machine learning model as part of using artificial intelligence to model a target object, in accordance with one or more embodiments.

FIG. 14 is an illustration of using an ML model 1410 as part of using artificial intelligence to model a target object, in accordance with one or more embodiments. The ML model 1410 is an example of the ML model 1316 of FIG. 13. The training of the ML model 1410 is further illustrated in the next figures.

In an example, the machine learning model 1410 includes an artificial neural network (ANN) trained to at least detect a target shown in an image and output position data of the target as detected in the image. The position data can correspond to a bounding box that surrounds the detected target and can be defined as camera UV coordinates. The ANN (or, possibly, another model, such as a classifier included in the machine learning model 1410) can also be trained to classify the detected target as having a target type. Additionally or alternatively, the ANN (or, possibly, another model, such as another ANN included in the machine learning model 1410) can also be trained to indicate a visual inspection property of the detected target.

As such, an input to the machine learning model 1410 is received. This input can include multiple images 1402. Each image 1402 can be generated by a camera while the camera is positioned at a predefined distance and orientation relative to a target included in an aircraft part and, thus, the image 1402 can show the target. For instance, an image 1402 showing a target is generated while the camera is positioned such that the target is at a predefined distance from the camera, is normalized to the camera, and is in the center of the field of view of the camera.

The images 1402 can be processed sequentially or in batches by being input sequentially or in batches to the ML model 1410. Sequential inputting can include inputting an image 1402 showing a target in real-time to the ML model 1410 relative to when the image 1402 is generated. Sequential inputting can also include preventing the repositioning of the camera to image another target until after an output of the ML model 1410 is generated and this output corresponds to a successful processing of the image 1402. If the processing is unsuccessful, the camera can be instructed to generate a new image showing the target while still being in the same position or by re-positioning the camera to improve the imaging of the target (e.g., to reposition the camera such that the target is in the center of its field of view, by changing the distance, and/or by changing the camera orientation). If the processing is successful, the camera can be repositioned relative to the next target and can be instructed to generate an image 1402 showing this target. Batch inputting can include positioning the camera relative to each target, generating the corresponding images 1402, and then inputting these images 1402 as a batch load to the ML model 1410.

Upon successful processing of an image 1402 showing a target, the output of the ML model 1410 can include the position data 1404 of the target (e.g., of the bounding box that surrounds the target). As explained herein above, the position data 1404 can be two-dimensional or three-dimensional depending on whether the image 1402 is two-dimensional or three-dimensional. Further, if the image is three-dimensional and/or if depth data is included in the input, the output can include the rotational data of the target. Additionally or alternatively, the output can include a classification 1406 of the target and/or a visual inspection property 1408 of the target.

Figure 15:
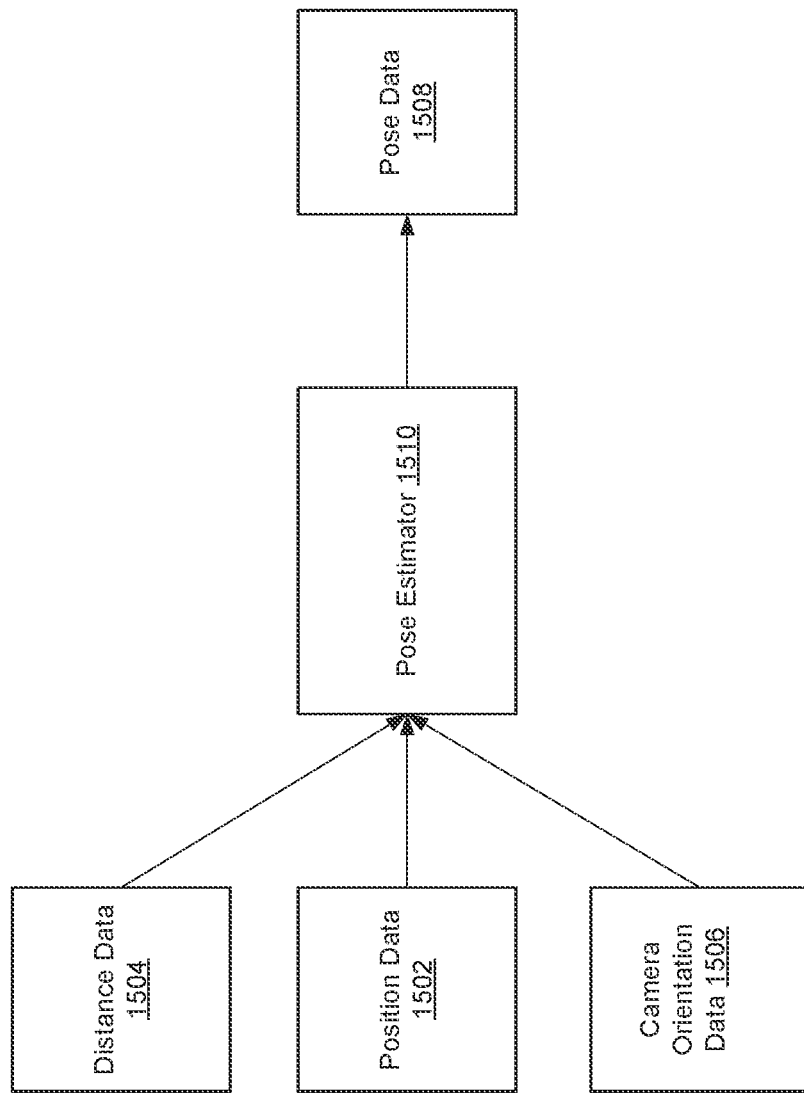
FIG. 15 is an illustration of estimating a pose of a target as part of using artificial intelligence to model a target object, in accordance with one or more embodiments.

FIG. 15 is an illustration of estimating a pose of a target as part of using artificial intelligence to model a target object, in accordance with one or more embodiments. In this illustration, an output of a machine learning model (e.g., the machine learning model 1410 of FIG. 14) includes position data 1502 that is two-dimensional. In addition to the position data 1502, distance data 1504 and camera orientation data 1506 can be input to a pose estimator 1510. The output of the pose estimator 1408 can include pose data 1508.

In an example, the position data 1502 can indicate a two-dimensional position of a bounding box that surrounds the target in a camera UV frame, where this bounding box corresponds to a detection of the target in an image. The image can be generated while the camera is positioned at a predefined distance and orientation relative to the target (e.g., such that the camera is normalized to the target). The distance data 1504 can indicate the predefined distance between the camera (e.g., a focal point thereof) and the target. The camera orientation data 1506 can indicate the orientation of the camera in a coordinate system of the camera and/or a coordinate system of a robot controlling the camera as a TCP.

The camera's pose is known in the coordinate system of the robot. Based on this pose and inverse kinematics, the pose estimator 1510 can translate the position data of the target into two-dimensional coordinates of the target (e.g., X, Y coordinates) in the coordinate system of the robot. Based on the camera's pose and inverse kinematics, the pose estimator 1510 can also translate the predefined distance into a third dimensional coordinate of the target (e.g., a Z coordinate) in the coordinate system of the robot. The orientation of the camera can be assumed to be the same or substantially similar to the orientation of the target. As such, the pose estimator 1510 can set the camera orientation data 1506 as the orientation data of the target in the coordinate system of the robot. As such, the pose estimator 1510 can estimate the pose of the target in the coordinate system of the robot. Based on forward kinematics, the pose estimator 1510 can translate this estimated pose to the coordinate system of the aircraft part. As such, the resulting pose data 1508 can include three-dimensional position data and orientation data of the target in the coordinate system of the robot and/or the coordinate system of the aircraft part.

The above illustrates the use case of two-dimensional position data that is output by an ML model. If the ML model outputs three-dimensional position data, this data would be expressed in the coordinate system of the camera. As such, by using inverse and/or forward kinematics transformations, the pose estimator 1510 can estimate the three-dimensional position of the target in the coordinate system of the robot and/or the coordinate system of the aircraft part. Similarly, if the ML model outputs orientation data, this data would be expressed in the coordinate system of the camera. As such, by using inverse and/or forward kinematics transformations, the pose estimator 1510 can estimate the orientation of the target in the coordinate system of the robot and/or the coordinate system of the aircraft part.

Once the pose data 1508 of the target is estimated, this pose data 1508 can be included in an updated multi-dimensional representation of the aircraft part. Alternatively, the updated multi-dimensional representation of the aircraft can be initialized to be the same as the modeled multi-dimensional representation of the aircraft part. In this case, once the pose data 1508 is updated, it can be compared to the modeled pose data of the corresponding modeled target. This comparison can indicate a threshold offset (e.g., a position offset and/or a rotation offset). If the offset is larger than a threshold offset, the pose data 1508 can replace the modeled pose data in the updated multi-dimensional representation. Otherwise (e.g., the offset is smaller than the threshold offset), the modeled pose data is retained in the updated multi-dimensional representation. The threshold offset can depend on the accuracy of the ML model and/or acceptable accuracy errors.

Figure 16:
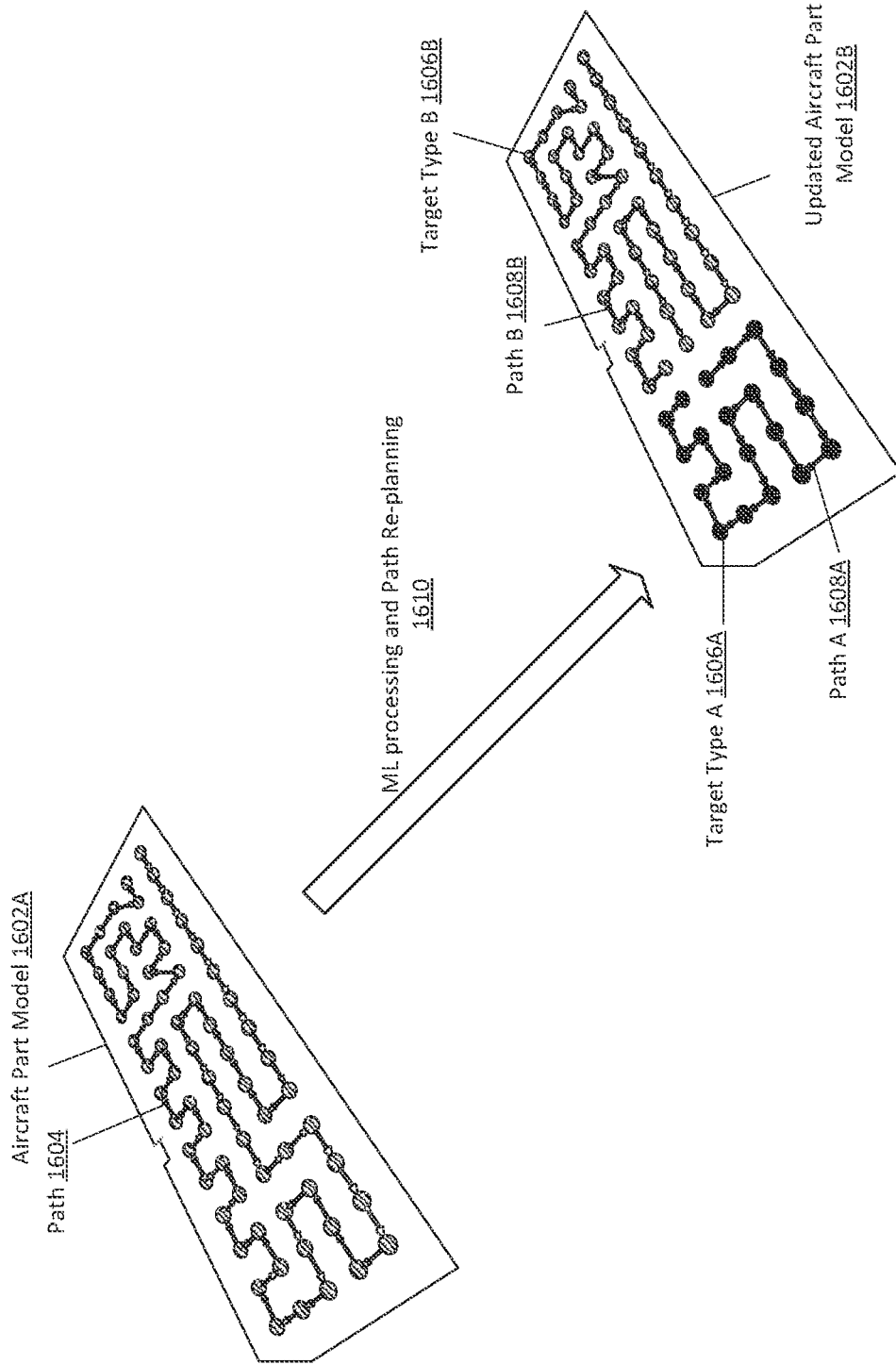
FIG. 16 is an illustration of re-classifying targets and updating paths for robotic operations, in accordance with one or more embodiments.

FIG. 16 is an illustration of re-classifying targets and updating paths for robotic operations, in accordance with one or more embodiments. In an example, an aircraft part model 1602A is defined. For instance, this aircraft part model 1602A includes a multi-dimensional (e.g., three-dimensional) representation of an aircraft part generated according to the techniques described herein above. Path modeling can be applied to modeled targets (e.g., waypoints) by using an optimization algorithm (e.g., a TSP solver) to define a path 1604 for traversing the modeled targets.

The aircraft part can be imaged, and the images can be processed as described herein above to generate an updated aircraft part model 1602B (e.g., an updated three-dimensional representation of the aircraft part). The updated aircraft part model 1602B can be further processed for path re-planning. These two types of processing are illustrated in FIG. 16 as an ML processing and path re-planning 1610.

The updated aircraft part model 1602B can indicate a target type and/or a visual inspection property per target. A filter can be set on either one or both of target types and/or visual inspection properties. For instance, a filter can be set for a particular type of fasteners and for fastener damage. The modeled targets in the updated aircraft part model 1602B can be filtered accordingly to generate a set of modeled targets (e.g., a set of fasteners that have the particular fastener type and that are damaged). The path re-planning 1610 can be applied to this set, whereby the optimization algorithm is applied thereto to define a path for traversing the only these modeled targets.

In the illustration of FIG. 16, two filters are used. A first filter corresponds to a first target type A 1606A. The corresponding modeled targets are shown with black solid shapes. A path A 1608A is generated for these modeled targets. Likewise, a second filter corresponds to a second target type B 1606B. The corresponding modeled targets are shown with dashed shapes. A path B 1608B is generated for these modeled targets. As such, say first target type A 1606A is a first fastener type. A robot can be instructed to perform first robotic operations on the corresponding targets by using a first fastener drill end effector based on the path A 1608A. Likewise, say the first target type B 1606B is a second fastener type. The robot can be instructed to perform second robotic operations on the corresponding targets by using a second fastener drill end effector based on the path B 1608B.

Figure 17:
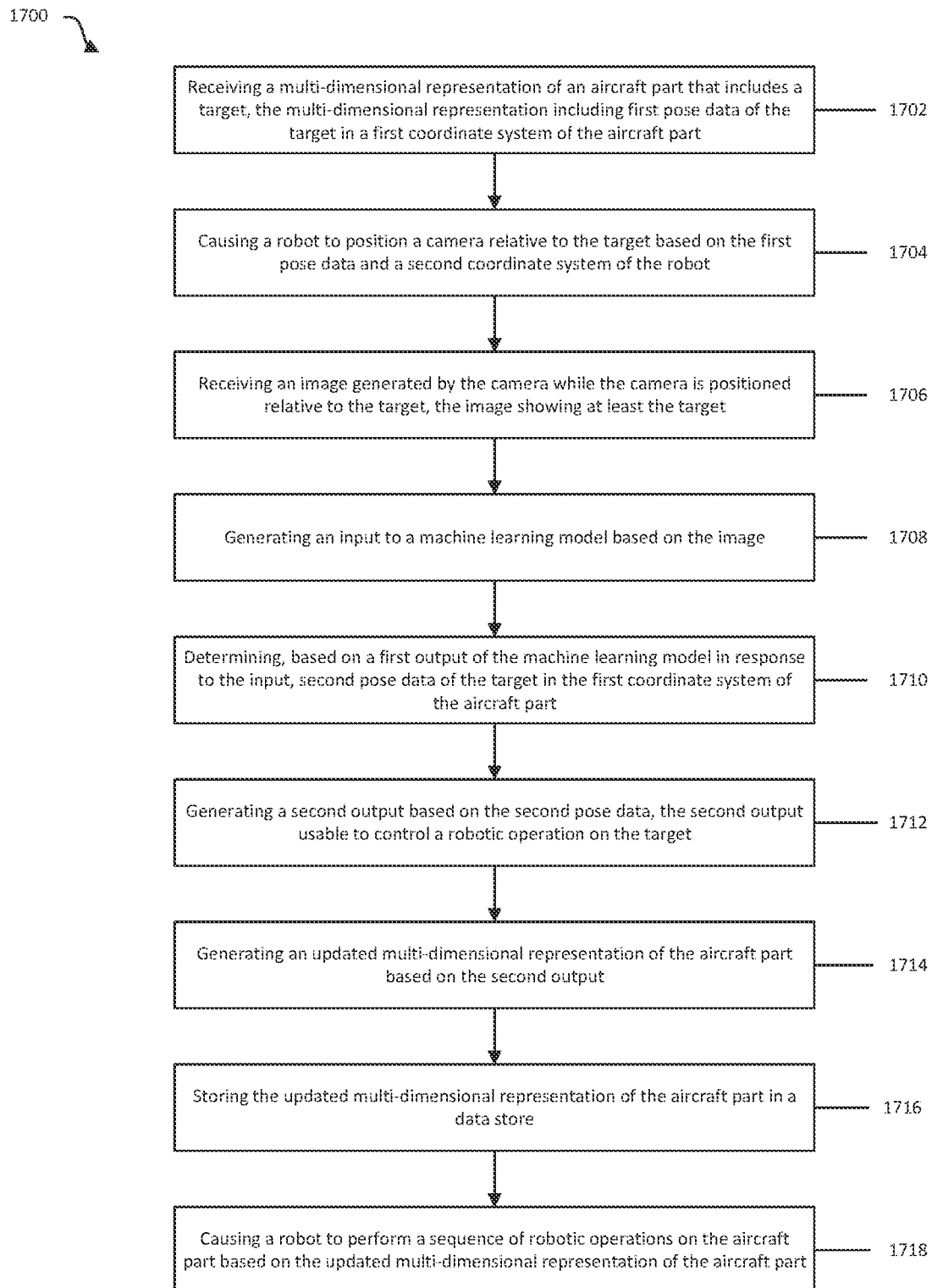
FIG. 17 is a process flow for using artificial intelligence to model a target object, in accordance with one or more embodiments.

FIG. 17 is a process flow 1700 for using artificial intelligence to model a target object, in accordance with one or more embodiments. The process flow 1700 can be implemented as a method by a system. The system can be a server, such as the server 1310 of FIG. 13. At 1702, the method can include receiving a multi-dimensional representation of an aircraft part that includes a target, the multi-dimensional representation including first pose data of the target in a first coordinate system of the aircraft part. For instance, the multi-dimensional representation is a three-dimensional representation generated by using the above techniques.

At 1704, the method can include causing a robot to position a camera relative to the target based on the first pose data and a second coordinate system of the robot. For instance, a job file is generated based on the multi-dimensional representation and sent to the robot. Based on the job file, the robot can determine a path for traversing a surface of the aircraft part, where the path includes a sequence of pose data corresponding to each target of the aircraft part. The camera is set as a TCP. Based on inverse and forward kinematics applied to the sequence, the robot determines a trajectory to position the camera relative to each target such that the camera can be positioned at a predefined distance and oriented in a normalized manner relative to the target.

At 1706, the method can include receiving an image generated by the camera while the camera is positioned relative to the target, the image showing at least the target. For instance, at each position, the robot can instruct the camera to generate a next image and can send this image to the system. In a sequential processing of images, the robot does not reposition the camera until receiving an indication back from the system of a successful processing of the current image. In a batch processing of images, the robot can proceed to reposition the camera absent any indication back from the system of a successful image processing.

At 1708, the method can include generating an input to a machine learning model based on the image. For instance, image processing is applied to the image (e.g., deblurring, cropping, etc.) and the resulting image data is included in the input. If depth data is generated based on a depth sensor, the depth data can also be included in the input.

At 1710, the method can include determining, based on a first output of the machine learning model in response to the input, second pose data of the target in the first coordinate system of the aircraft part. For instance, the first output can indicate position data in a camera UV frame. If the position data is two-dimensional, a pose estimator can estimate a third dimension of the position data based on the predefined distance of the camera. Using inverse and forward kinematics transformations, the three-dimensional position data can be translated to the first coordinate system. If the position data is already three-dimensional, the inverse and forward kinematics transformations are used for the translation to the first coordinate system. If the first output indicates orientation data of the part, the inverse and forward kinematics transformations are used for translating the orientation data to the first coordinate system. Otherwise, the orientation data can be estimated from the orientation of the camera and/or from the depth data to then be translated to the first coordinate system. Further the first output can indicate a classification and/or visual inspection property of the target.

At 1712, the method can include generating a second output based on the second pose data, the second output usable to control a robotic operation on the target. For instance, the first pose data and the second pose data are compared to determine an offset. If the offset is larger than a threshold offset, the second pose data can be flagged as measured pose data suitable to replace the first pose data. Otherwise, the first pose data need not be updated. Similarly, the classification (or a target type) indicated by the first output can be compared to modeled classification (or a modeled target type) included in the multi-dimensional representation. If different, the classification can be flagged as suitable to replace the modeled classification. Likewise, the visual inspection property indicated by the first output can be compared to modeled visual inspection property included in the multi-dimensional representation. If different, the visual inspection property can be flagged as suitable to replace the modeled visual inspection property. An updated multi-dimensional representation of the aircraft part can be generated by updating the multi-dimensional representation, whereby modeled pose data, modeled classifications, and/or modeled visual inspection properties are replaced with measured pose data, determined classifications, and/or determined visual inspection properties as applicable. The updated multi-dimensional representation can then be used for path re-planning and subsequent trajectory planning that control robotic operations.

At 1714, the method can include generating the updated multi-dimensional representation of the aircraft part based on the second output. For instance, modeled pose data, modeled classifications, and/or modeled visual inspection properties are replaced with measured pose data, determined classifications, and/or determined visual inspection properties as applicable.

At 1716, the method can include storing the updated multi-dimensional representation of the aircraft part in a data store. For instance, the updated multi-dimensional representation of the aircraft part is stored in association with an identifier of the aircraft part and/or an identifier of an aircraft that includes the aircraft part, as applicable.

At 1718, the method can include causing a robot to perform a sequence of robotic operations on the aircraft part based on the updated multi-dimensional representation of the aircraft part. The robot may, but need not, be the same as the robot used to position the camera. Path and trajectory planning can be generated based on updated multi-dimensional representation to control the positioning of an end effector of the robot relative to at least some of the targets. The end effector can be configured to perform the robotic operations on such targets.

Figure 18:
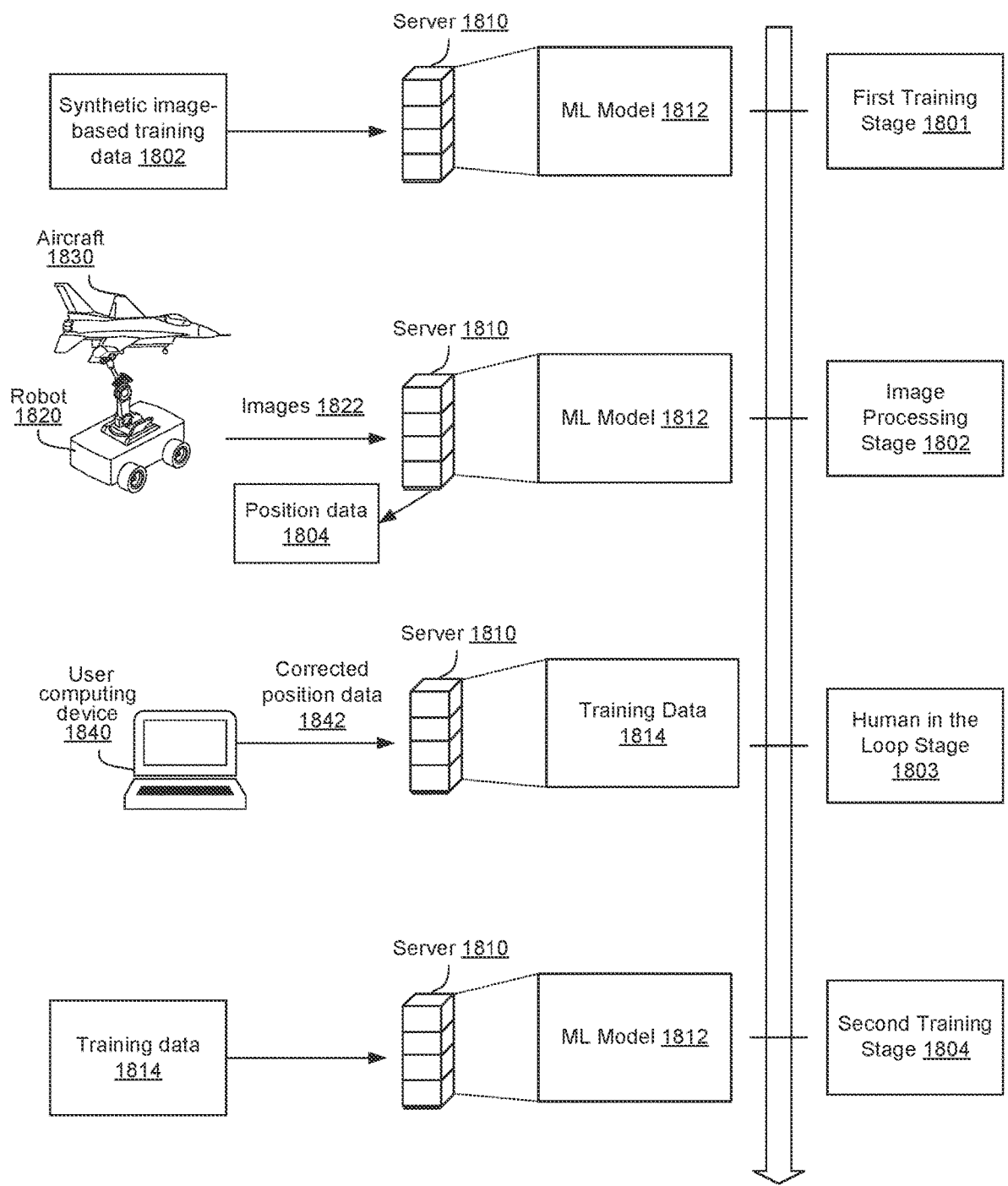
FIG. 18 is an illustration of an environment for artificial intelligence training, in accordance with one or more embodiments.

FIG. 18 is an illustration of an environment for artificial intelligence training, in accordance with one or more embodiments. The artificial intelligence training can use synthetic image-based training and actual image-based training. In the illustration of FIG. 18, the artificial intelligence training is illustrated using multiple stages. Each of these stages is described herein next.

In a first training stage 1801, a server 1810 can receive and train an ML model 1812. The server 1810 can be the same as or different from the server 1310 of FIG. 13. The ML model 1812 can be pre-trained for at least object detection, where this training is generic and not specific to aircraft parts and/or targets included in aircraft parts. For instance, the ML model 1812 can include a single-shot multibox detection (SSD) network trained to perform object detection, such as a MobileNet SSD. The first training stage 1801 further trains the ML model 1812 to at least detect targets included in aircraft parts, where this training uses synthetic image-based training data 1802. The target detection can include determining two-dimensional position data of detected targets in two-dimensional images and/or three-dimensional position data of detected targets in three-dimensional images and, possibly, pose data of detected targets in two or three-dimensional images based on depth data. The ML model 1812 can also be trained to classify targets into target types and/or to indicate visual inspection properties of targets. The training may remove and replace an output layer of the ML model 1812 with a new output layer for the target detection and, as applicable, classification and/or visual inspection property determination.

The synthetic image-based training data 1802 can include synthetic images showing modeled targets of different types and across different aircraft parts and/or aircrafts. In an example, generating a synthetic image that shows a modeled target that corresponds to a target of an aircraft part, the multi-dimensional representation of the aircraft part is used. This multi-dimensional representation can indicate the pose data, target type, and visual inspection property of the modeled target. A two-dimensional image can be generated by generating a two-dimensional snapshot of the modeled target from the multi-dimensional representation. Two-dimensional position data from the pose data are associated with the two-dimensional image.

Likewise, the target type and visual inspection property are associated with the two-dimensional image. The two-dimensional image can be set as a synthetic image that shows the modeled target. This synthetic image and the associated position data, target type, and visual inspection property can be included in the synthetic image-based training data 1802. The position data, target type, and visual inspection property as the ground truth associated with the synthetic image (e.g., as a training label). Further, an image transformation (e.g., blurring, distorting, mirroring, etc.) can be applied to the two-dimensional image to generate another synthetic image. Here, if the image transformation changes the position data (e.g., based on some translation or rotation function), the same function can be applied to the position data to then generate updated position data. The target type and the visual inspection property do not change with the image transformation. This synthetic image and the associated position data (updated as applicable), target type, and visual inspection property can be included in the synthetic image-based training data 1802, where also the associated position data (updated as applicable), target type, and visual inspection property are set as the ground truth for this synthetic image. Even with a two-dimensional synthetic image, the orientation data of the target can be included in the training label, such that the ML model 1812 can be trained to estimate target orientations from two-dimensional images. Additionally or alternatively, to generating two-dimensional images, three-dimensional images can be generated by applying three-dimensional snapshotting to the multi-dimensional representation of the aircraft part and applying image transformation to three-dimensional snapshots, and included in the synthetic image-based training data 1802. For a three-dimensional synthetic image, the associated three-dimensional data (updated as applicable if an image transformation is applied and impacts such position data), target type, and visual inspection property can be included in the synthetic image-based training data 1802 as the ground truth for this three-dimensional synthetic.

Furthermore, in the first training stage 1801, a loss function can be used to train the ML model 1812. For instance, the loss function can be defined using an offset between estimated position data and ground truth position data (two or three-dimensional). As applicable, the loss function can also be defined using an offset between estimated orientation data and ground truth orientation data, a classification mismatch between a determined target type and a ground truth target type, and/or a classification mismatch between a determined visual inspection property and a ground truth visual inspection property. The training can be iterative to minimize the loss function by using a backpropagation algorithm to update parameters of the ML model 1812 (e.g., the weights between connections of nodes across different layers).

Next, in an image processing stage 1802, the server 1810 receives images 1822 from a robot 1820 (similar to the robot 1320 of FIG. 13) that images targets of an aircraft part that may be included in an aircraft 1830. These images may be generated according to the techniques described herein above and can be used to generate inputs to the ML model 1812. Based on an input that corresponds to an image showing a target, the ML model 1812 can output position data 1804 (e.g., two-dimensional or three-dimensional, as applicable) and, as applicable, orientation data, target type, and/or visual inspection property.

In a human in the loop stage 1803, human in the loop training can be triggered. For example, the output of the ML model 1812 (or at least the position data 1804) can be subject to human review, and as applicable, corrected. Each output can be reviewed, or a sample of the outputs can be reviewed. Additionally or alternatively, a selection procedure can be implemented to select the set of outputs for review. For outputs related to an aircraft part, this selection procedure can rely on the multi-dimensional representation of the aircraft part. In particular, an output can be specific to a target of the aircraft part and can include determined position data of the target and, optionally, determined orientation data, a determined target type, and a determined visual inspection property of the target. The multi-dimensional representation can include, for the target, modeled position data, modeled orientation data, a modeled target type, and a modeled visual inspection property of the target. The determined position data can be compared to the modeled position data to determine an offset and this offset can be compared to a threshold offset. If larger than the threshold offset, the output is flagged for human review. Similarly, the determined orientation data can be compared to the modeled orientation data to determine an offset and this offset can be compared to a threshold offset. If larger than the threshold offset, the output is flagged for human review. Additionally or alternatively, the determined target type can be compared to the modeled target type to determine whether a match exists. If a mismatch exists instead, the output is flagged for human review. Additionally or alternatively, the determined visual inspection property can be compared to the modeled visual inspection property to determine whether a match exists. If a mismatch exists instead, the output is flagged for human review.

A human review of an output can involve making a correction to the output. The human review can be received by the server 1810 from a user computing device 1840 operated by a human user. In particular, the output and the corresponding image that was processed to generate the output are presented via a UI on the user computing device 1840. User input is received by the user computing device and indicates correction data. The correction data can be any or a combination of corrected position data, corrected orientation data, a corrected target type, and/or a corrected visual inspection property. The image is then added to training data 1814. The corrected position data, corrected orientation data, a corrected target type, and/or a corrected visual inspection property are also added to the training data 1814 as ground truth of the image (e.g., as a training label(s) associated with the image).

Next, in a second training stage 1804, the ML model 1812 is further trained based on the training data 1814. Here, and unlike the first training stage 1801, the output layer need not be removed or replaced. Instead, the same loss function can be re-used to iteratively refine the parameters of the ML model 1812 such that the loss function is minimized.

Figure 19:
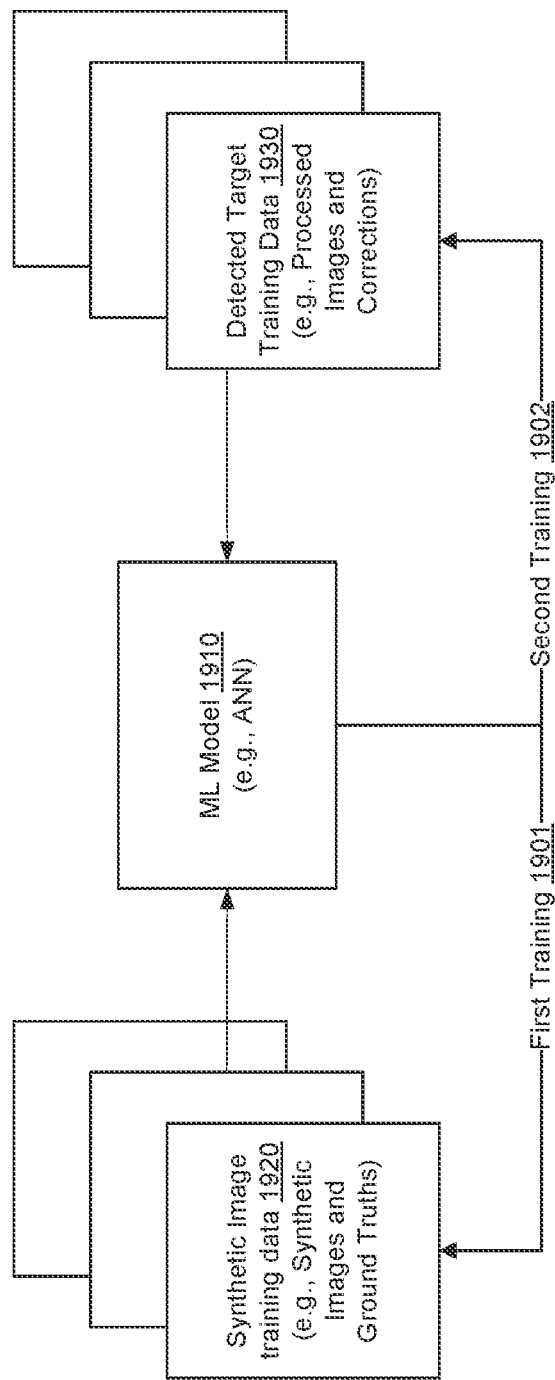
FIG. 19 is an illustration of a training approach that uses synthetic image training data and detected target training data, in accordance with one or more embodiments.

FIG. 19 is an illustration of a training approach that uses synthetic image training data 1920 and detected target training data 1930, in accordance with one or more embodiments. The synthetic image training data 1920 can correspond to the synthetic image-based training data 1802 of FIG. 18, whereas the detected target training data 1930 can correspond to the training data 1814 of FIG. 18.

In the illustration of FIG. 19, the training approach involves first training 1901 and second training 1902. In the first training 1901, the synthetic image training data 1920 is used to reconfigure a generically trained ML model 1910 (e.g., a Convolutional Neural Network) such that this trained ML model 1910 can process images showing targets of aircraft parts. The synthetic image training data 1920 can include synthetic images and ground truths associated with the synthetic images. In the second training 1902, the detected target training data 1930 is used to refine parameters of the ML model 1910 previously trained in the first training 1901, such that this ML model 1910 can more accurately process images showing targets of aircraft parts. The detected target training data 1930 can include actual images showing targets of aircraft parts and corrections to the outputs of the ML model 1910, where these corrections can be based on a human in the loop training and can be used as the ground truths associated with the actual images. Once the first training 1901 ends, the actual images can be processed and then the corrections can be received to initiate the second training 1902. The second training 1902 can be continuous (e.g., repeated at time intervals over a planning horizon), where the ML model 1910 can be used for the image processing.

Figure 20:
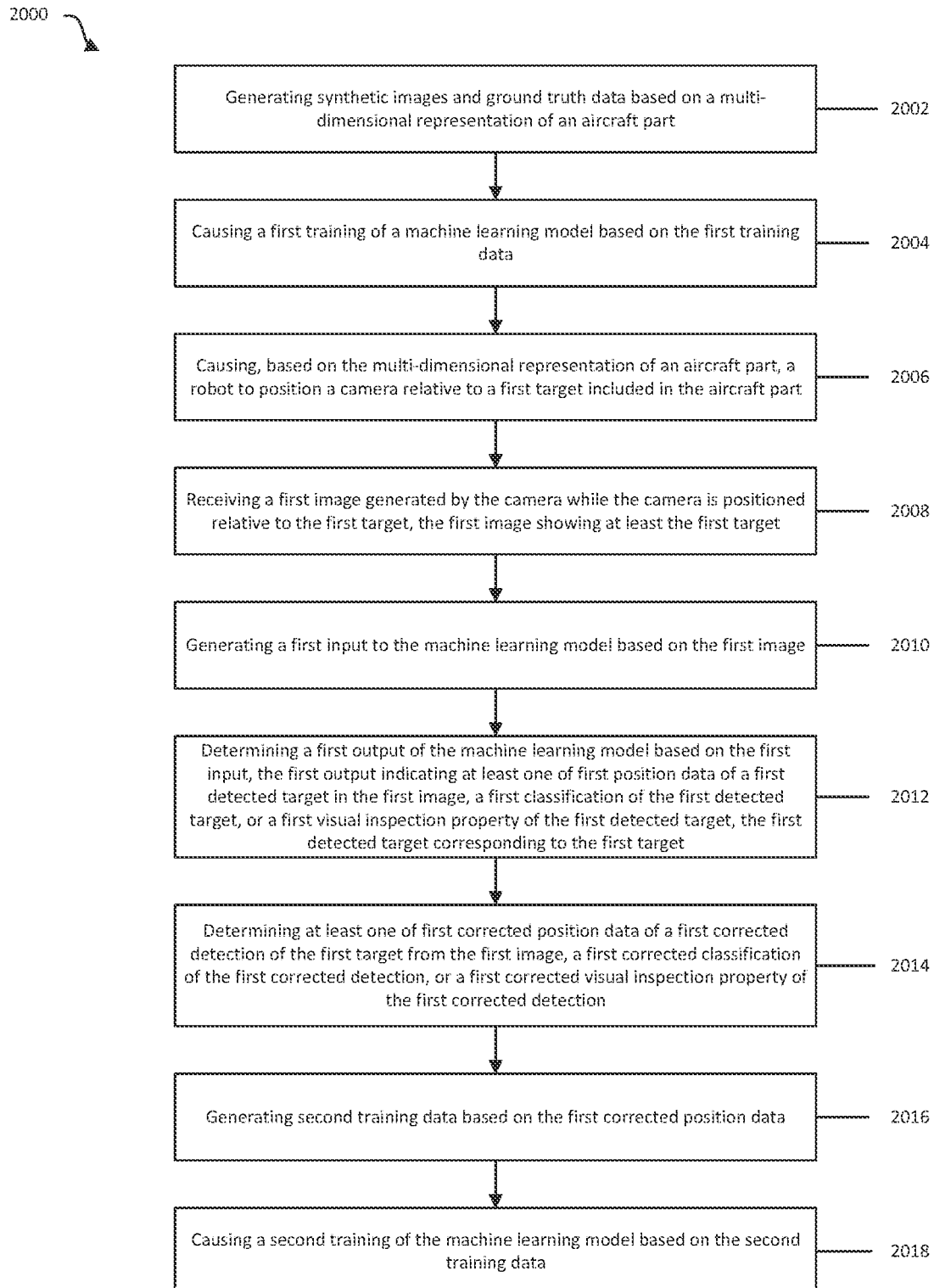
FIG. 20 is a process flow for artificial intelligence training, in accordance with one or more embodiments.

FIG. 20 is a process flow 2000 for artificial intelligence training, in accordance with one or more embodiments. The process flow 2000 can be implemented as a method by a system. The system can be a server, such as the server 1810 of FIG. 18. At 2002, the method can include generating synthetic images and ground truth data based on a multi-dimensional representation of an aircraft part. As described herein above, two or three-dimensional snapshotting can be applied to the multi-dimensional representation to generate an image (two dimensional or three-dimensional) showing a modeled target. This image can be set as a synthetic image and position data, orientation data, target type, and visual inspection property indicated in the multi-dimensional representation for the modeled target are associated with the synthetic image as its ground truth data. An image transformation may be applied to this image and, as applicable, to the position data and/or orientation data to generate another synthetic image and another set of ground truth data.

At 2004, the method can include causing a first training of a machine learning model based on the first training data. For instance, the first training data is input to the machine learning model. A loss function is defined, and the parameters of the machine learning model are updated to minimize the loss function.

At 2006, the method can include causing, based on the multi-dimensional representation of an aircraft part, a robot to position a camera relative to a first target included in the aircraft part. This operation of the method can be similar to operation 1704 of FIG. 17.

At 2008, the method can include receiving a first image generated by the camera while the camera is positioned relative to the first target, the first image showing at least the first target. This operation of the method can be similar to operation 1706 of FIG. 17.

At 2010, the method can include generating a first input to the machine learning model based on the first image. This operation of the method can be similar to operation 1708 of FIG. 17.

At 2012, the method can include determining a first output of the machine learning model based on the first input, the first output indicating at least one of a first position data of a first detected target in the first image, a first classification of the first detected target, or a first visual inspection property of the first detected target, the first detected target corresponding to the first target. This operation of the method can be similar to operation 1710 of FIG. 17.

At 2014, the method can include determining at least one of first corrected position data of a first corrected detection of the first target from the first image, a first corrected classification of the first corrected detection, or a first corrected visual inspection property of the first corrected detection. For instance, a human in the loop training approach is invoked, whereby correction data is received from a user computing device. The server can send the first image and the first output to the computing device that then presents such data on a UI. User input can be received in response to indicate the correction data. The first image and the first output can be selected for review based on a sampling or on a selection procedure that relies on the multi-dimensional representation of the aircraft part.

At 2016, the method can include generating second training data based on the first corrected position data. For instance, the first image is included in the second training data. The correction data is also included in the second training data as ground truth data associated with the first image.

At 2018, the method can include causing a second training of the machine learning model based on the second training data. This operation is similar to operation 2004, whereby the second training data is used instead of the first training data.

Figure 21:
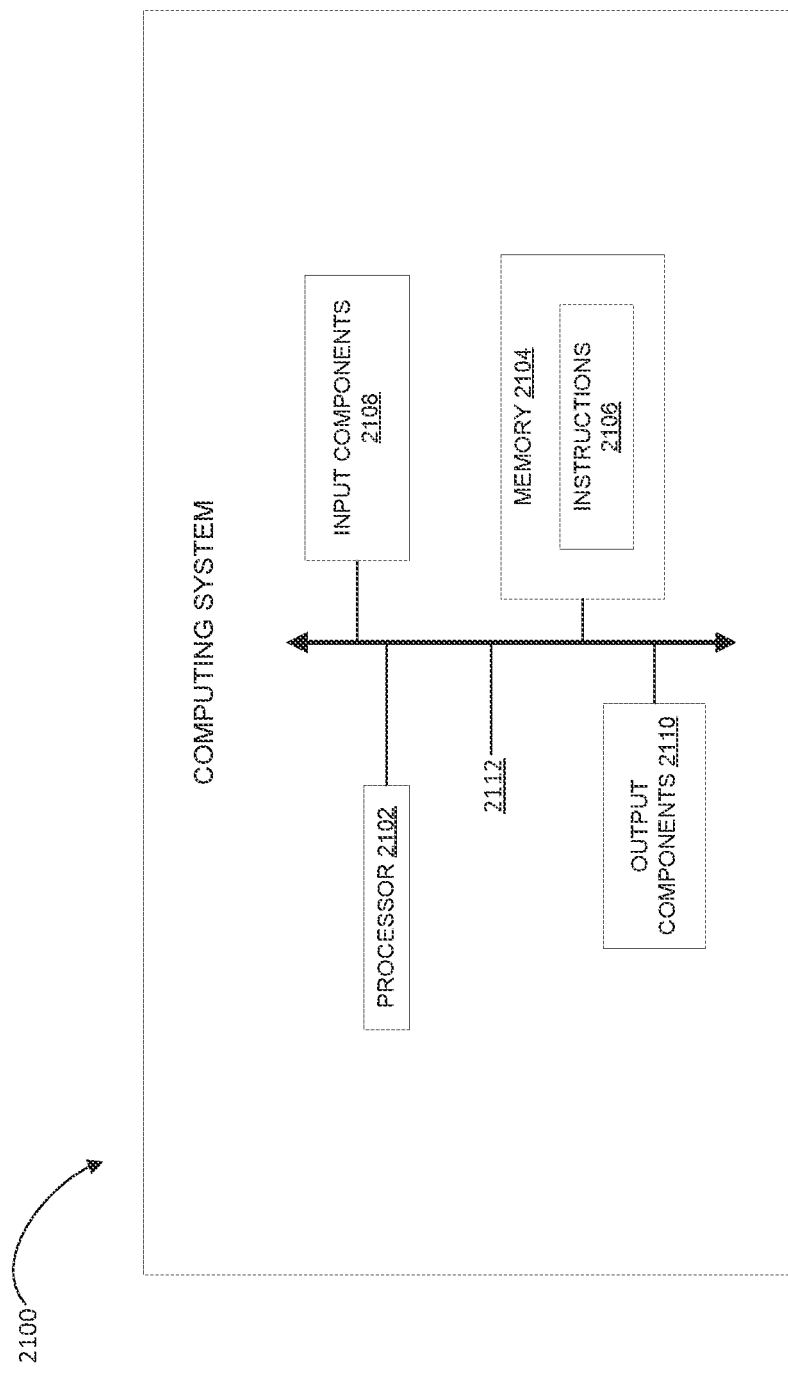
FIG. 21 is a block diagram of an example of a computing system, in accordance with one or more embodiments.

FIG. 21 is a block diagram of an example of a computing system 2100 usable for implementing some aspects of the present disclosure. Components of the computing system 2100 can be part of a computing device, a server, a robot, and/or distributed between any two of a computing device, a server, and a robot. The computing system 2100 includes a processor 2104 coupled to a memory 2104 via a bus 2112. The processor 2102 can include one processing device or multiple processing devices. Examples of the processor 2102 include a Field-Programmable Gate Array (FPGA), an application-specific integrated circuit (ASIC), a microprocessor, or any combination of these. The processor 2102 can execute instructions 2106 stored in the memory 2104 to perform operations. In some examples, the instructions 2106 can include processor-specific instructions generated by a compiler or an interpreter from code written in any suitable computer-programming language, such as C, C++, C #, Python, or Java.

The memory 2104 can include one memory device or multiple memory devices. The memory 2104 may be non-volatile and include any type of memory device that retains stored information when powered off. Examples of the memory 2104 can include electrically erasable and programmable read-only memory (EEPROM), flash memory, or any other type of non-volatile memory. At least some of the memory 2104 includes a non-transitory computer-readable medium from which the processor 2102 can read instructions 2106. A computer-readable medium can include electronic, optical, magnetic, or other storage devices capable of providing the processor 2102 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 2106.

The computing system 2100 may also include other input and output (I/O) components. The input components 2108 can include a mouse, a keyboard, a trackball, a touch pad, a touch-screen display, or any combination of these. The output components 2110 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving a multi-dimensional representation of an aircraft part that includes a target, the multi-dimensional representation including first pose data of the target in a first coordinate system of the aircraft part, wherein the multi-dimensional representation of the aircraft part indicates a first target type of the target;
   causing a robot to position a camera relative to the target based on the first pose data and a second coordinate system of the robot;
   receiving an image generated by the camera while the camera is positioned relative to the target, the image showing at least the target;
   generating an input to a machine learning model based on the image;
   determining, based on a first output of the machine learning model in response to the input, second pose data of the target in the first coordinate system of the aircraft part, wherein the first output of the machine learning model indicates that the target is classified as having a second target type that matches the first target type; and
   generating a second output based on the second pose data, the second output usable to control a robotic operation on the target.

2. The computer-implemented method of claim 1, wherein the second pose data is determined in the first coordinate system based on an inverse kinematics transformation from a third coordinate system of the camera to the second coordinate system of the robot and a forward kinematics transformation from the second coordinate system of the robot to the first coordinate system of the aircraft part.

3. The computer-implemented method of claim 1 further comprising: and
   determining whether an offset between the first pose data and the second pose data exists;
   if the offset exists, storing an updated multi-dimensional representation of the aircraft part that includes the second pose data instead of the first pose data, wherein the updated multi-dimensional representation is usable to control the robotic operation on the target; or
   if the offset does not exist, storing the updated multi-dimensional representation of the aircraft part that includes the first pose data or the second pose data.

4. The computer-implemented method of claim 3, wherein the first output of the machine learning model indicates a visual inspection property of the target, and wherein the updated multi-dimensional representation includes the visual inspection property.

5. The computer-implemented method of claim 1, wherein the camera is positioned relative to the target by setting the camera as a tool center point (TCP) in the second coordinate system of the robot and by expressing the first pose data in the second coordinate system based on a forward kinematics transformation.

6. The computer-implemented method of claim 1, wherein the camera is positioned relative to the target such that the target is at a first position within a field of view of the camera, and wherein the second pose data is determined by at least:
   determining a second position of a bounding box around a detection of the target in the image, the second position indicated in the first output of the machine learning model;
   determining an offset between the second position and the first position; and
   determining the second pose data based on the offset.

7. The computer-implemented method of claim 6, wherein the camera is positioned relative to the target such that the camera is at a predefined distance from the target, wherein the offset is determined in a third coordinate system of the camera, and wherein the second pose data is determined by at least:
   determining, based on the offset, an X-Y offset in the second coordinate system of the robot;
   determining, based on the predefined distance, a Z-offset in the second coordinate system;
   determining, based on the X-Y offset and the Z-offset, first positional data of the target in the second coordinate system; and
   determining second position data based on the first position data and a transformation between the first coordinate system of the aircraft part and the second coordinate system, wherein the second pose data includes the second position data.

8. The computer-implemented method of claim 1, wherein the second pose data is determined by at least:
  determining a first orientation of the camera in the second coordinate system of the robot, wherein the camera is positioned relative to the target such that the camera has the first orientation; and
  determining the second pose data based on the first orientation.

9. The computer-implemented method of claim 8, and wherein the second pose data is determined by at least:
  determining a second orientation of the target based on the first orientation of the camera and a transformation between the first coordinate system of the aircraft part and the second coordinate system, wherein the second pose data indicates the second orientation.

10. The computer-implemented method of claim 1, wherein the second pose data is determined by at least:
  determining depth data associated with the target based on a depth sensor;
  determining, based on the depth data, a first orientation of the target in the second coordinate system of the robot; and
  determining a second orientation of the target based on the first orientation and a transformation between the first coordinate system of the aircraft part and the second coordinate system, wherein the second pose data indicates the second orientation.

11. A system comprising:
  one or more processors; and
  one or more memory storing instructions that, upon execution by the one or more processors, configure the system to:
    receive a multi-dimensional representation of an aircraft part that includes a target, the multi-dimensional representation including first pose data of the target in a first coordinate system of the aircraft part;
    cause a robot to position a camera relative to the target based on the first pose data and a second coordinate system of the robot;
    receive an image generated by the camera while the camera is positioned relative to the target, the image showing at least the target;
    generate an input to a machine learning model based on the image;
    determining, based on a first output of the machine learning model in response to the input, second pose data of the target in the first coordinate system of the aircraft part and a first classification of the target;
    generate a second output based on the second pose data, the second output usable to control a robotic operation on the target;
    determine that a set of targets of the aircraft part are classified as having a target type; and
    generate a job file indicating pose data of each target of the set and a sequence of robotic operations to be performed across the targets of the set.

12. The system of claim 11, wherein the one or more memory store further instructions that, upon execution by the one or more processors, configure the system to:
  cause, based on the multi-dimensional representation of the aircraft part, the robot to position the camera relative to each target of a plurality of targets of the aircraft part;
  receive a plurality of images generated by the camera, each of the plurality of images corresponding to one of the plurality of targets,
  determine, by using the machine learning model and based on the plurality of images, a classification and pose data for each target of the plurality of targets; and
  store the classification and the pose data of each target in a data store.

13. The system of claim 12, wherein the one or more memory store first additional instructions that, upon execution by the one or more processors, configure the system to:
  determine, by using the machine learning model and based on the plurality of images, a visual inspection property for each target of the plurality of targets; and
  store the visual inspection property of each target in the data store.

14. The system of claim 13, wherein the one or more memory store second additional instructions that, upon execution by the one or more processors, configure the system to:
  determine that a set of targets of the aircraft part have a particular visual inspection property; and
  generate a job file indicating pose data of each target of the set.

15. The system of claim 11, wherein the target and the image are a first target and a first image, respectively, and wherein the one or more memory store further instructions that, upon execution by the one or more processors, configure the system to:
  cause, based on the multi-dimensional representation of the aircraft part, the robot to position the camera relative to a second target of the aircraft part;
  receive a second image generated by the camera and showing at least a portion of the second target,
  determine, by using the machine learning model and based on the first image and the second image, that the first target is classified as having a target type to which the robotic operation applies and that the second target is classified as not having the target type or as being of a different target type to which the robotic operation is inapplicable; and
  store a first classification of the first target and a second classification of the second target in a data store.

16. One or more non-transitory computer-readable storage media storing instructions that, upon execution on a system, cause the system to perform operations comprising:
  receiving a multi-dimensional representation of an aircraft part that includes a target, the multi-dimensional representation including first pose data of the target in a first coordinate system of the aircraft part;
  causing a robot to position a camera relative to the target based on the first pose data and a second coordinate system of the robot;
  receiving an image generated by the camera while the camera is positioned relative to the target, the image showing at least the target;
  generating an input to a machine learning model based on the image;
  determining, based on a first output of the machine learning model in response to the input, second pose data of the target in the first coordinate system of the aircraft part;
  generating a second output based on the second pose data, the second output usable to control a robotic operation on the target receive a plurality of images generated by the camera, each of the plurality of images corresponding to one of a plurality of targets of the aircraft part;
  determine, by using the machine learning model and based on the plurality of images, a visual inspection property for each target of the plurality of targets; and store the visual inspection property of each target in a data store.

17. The one or more non-transitory computer-readable storage media of claim 16, wherein the target is a fastener or a fastener hole.

18. The one or more non-transitory computer-readable storage media of claim 16, wherein the first output of the machine learning model indicates a fastener classification and a visual inspection property, and wherein the operations further comprise:
storing the fastener classification, the visual inspection property, and at least one of the first pose data or the second pose data in a data store in association with at least one of the aircraft part or a tail number of an aircraft that includes the aircraft part.

19. A computer-implemented method comprising:
receiving a multi-dimensional representation of an aircraft part that includes a first target, the multi-dimensional representation including first pose data of the first target in a first coordinate system of the aircraft part;
causing a robot to position a camera relative to the first target based on the first pose data and a second coordinate system of the robot;
receiving a first image generated by the camera while the camera is positioned relative to the first target, the first image showing at least a portion of the first target;
generating an input to a machine learning model based on the first image;
determining, based on a first output of the machine learning model in response to the input, second pose data of the first target in the first coordinate system of the aircraft part;
generating a second output based on the second pose data, the second output usable to control a robotic operation on the first target;
causing, based on the multi-dimensional representation of the aircraft part, the robot to position the camera relative to a second target of the aircraft part;
receiving a second image generated by the camera and showing at least a portion of the second target,
determining, by using the machine learning model and based on the first image and the second image, that the first target is classified as having a target type to which the robotic operation applies and that the second target is classified as not having the target type or as being of a different target type to which the robotic operation is inapplicable; and
storing a first classification of the first target and a second classification of the second target in a data store.

20. The computer-implemented method of claim 19, further comprising:
generating a job file indicating pose data of each of the first target and the second target and a sequence of robotic operations to be performed across the first target and the second target.

* * * * *